(12) United States Patent
Sukenari et al.

(10) Patent No.: US 7,394,978 B2
(45) Date of Patent: Jul. 1, 2008

(54) IMAGING DEVICE

(75) Inventors: Kazuhiro Sukenari, Nagoya (JP);
Hiroshi Yamakose, Gifu (JP)

(73) Assignee: Elmo Company Limited (JP)

( * ) Notice: Subject to any disclaimer, the term of this patent is extended or adjusted under 35 U.S.C. 154(b) by 392 days.

(21) Appl. No.: 11/193,219

(22) Filed: Jul. 28, 2005

(65) Prior Publication Data

US 2006/0110151 A1 May 25, 2006

(30) Foreign Application Priority Data

Nov. 25, 2004 (JP) ............................. 2004-339699

(51) Int. Cl.
*G03B 15/03* (2006.01)
(52) U.S. Cl. .................... 396/155; 396/86; 396/133; 348/373; 348/374; 348/375; 348/376; 248/187.1; 248/593
(58) Field of Classification Search ............... 396/86, 396/133, 155; 348/373, 240.1, 374, 375, 348/376; 248/187.1, 593
See application file for complete search history.

(56) References Cited

U.S. PATENT DOCUMENTS

| 5,247,330 | A | * | 9/1993 | Ohyama et al. | 355/64 |
| 5,444,486 | A | * | 8/1995 | Mizuno et al. | 348/376 |
| 5,642,206 | A | * | 6/1997 | Yamamori et al. | 358/471 |
| 5,751,355 | A | * | 5/1998 | Bito et al. | 348/375 |
| 5,978,028 | A | * | 11/1999 | Yamane | 348/373 |
| 6,008,846 | A | * | 12/1999 | Uehara et al. | 348/373 |
| 6,317,155 | B1 | * | 11/2001 | Ohyama | 348/373 |
| 2003/0076441 | A1 | * | 4/2003 | Maeda et al. | 348/375 |
| 2003/0095200 | A1 | * | 5/2003 | Nagano | 348/373 |
| 2003/0227563 | A1 | * | 12/2003 | Ting | 348/375 |
| 2004/0233325 | A1 | * | 11/2004 | Lee et al. | 348/375 |
| 2005/0168627 | A1 | * | 8/2005 | Yi et al. | 348/373 |

FOREIGN PATENT DOCUMENTS

JP 2004-274503 9/2004

* cited by examiner

*Primary Examiner*—W. B. Perkey
*Assistant Examiner*—Warren K Fenwick
(74) *Attorney, Agent, or Firm*—Ostrolenk, Faber, Gerb & Soffen, LLP

(57) ABSTRACT

Usability of device is improved for an imaging device that images a target object mounted on a table. In order to hold a camera head 120 and an illumination unit 130 with respect to a table 110 on which a target object is mounted, an imaging device 100 coaxially and rotatably supports a camera head holding arm 140 and an illumination unit holding arm 150 at an elevated portion 118, which is located at an inner-left corner of the table 110, such that degrees of inclinations of the arms may be variable with respect to the table 110. The arms are rotatably and axially supported at the elevated portion 118 such that the camera holding arm 140 can rotate with an accompanying rotation of the illumination unit holding arm 150 and the illumination unit holding arm 150 can rotate independently with no accompanying rotation of the camera holding arm 140.

10 Claims, 17 Drawing Sheets

IMAGING DEVICE

CLAIM OF PRIORITY

The present application claims priority from Japanese Application P2004-339699 filed on Nov. 25, 2004, the content of which is hereby incorporated by reference into this application.

BACKGROUND OF THE INVENTION

Description of the Related Art

The present invention relates to an imaging device that images a target object mounted on a table.

In order to compensate for insufficiency of light quantity at the time of imaging the target object mounted on the table by using a camera head, the imaging device of this type employs an illumination unit to illuminate the target object on the table. The imaging device also employs arms to respectively hold the camera head and the illumination unit with respect to the table or employs a holding arm for the camera head to also hold the illumination unit. The use of the holding arm(s) is disclosed in, for example, Japanese Patent Laid-open Gazette No. 2004-274503.

However, it was pointed out that the imaging device disclosed in the above-mentioned Patent Document presents the following problems not only in the course of imaging the target object but also in the course of preparing for the imaging or of being stored, or when a user tries to connect the device with an external device or to treat the illumination unit, etc.

In such device, the camera head i.e. a precision instrument is held with respect to the table by means of the arm. Therefore, the camera head is preferably held in an attitude as stable as possible when the device is not in use. For example, the holding arm of the camera head may be inclined toward the table side to bring the camera head closer to the table side and reduce an overall height of the device. In some cases, the holding arm of the illumination unit may also be inclined toward the table side to bring the illumination unit laid over the table top surface. At the time of using the device (or at the time of imaging), a user of the device may return the arms to their respective given positions such that the camera head may be located above the table or the illumination unit may illuminate the target object from the above.

The holding arm for the camera head and the holding arm for the illumination unit are generally rotated in such case, and it was conventionally necessary to rotate these arms independently from each other. In case where a locking mechanism is provided between the holding arm for the camera head and the holding arm for the illumination unit, as disclosed in the above-mentioned Patent Document, it was necessary to enable the locking mechanism before rotating either one of the arms.

In the meantime, it is also necessary to reposition the illumination unit independently according to shape or condition of the target object or depending on absence or presence of glare of illumination in the camera head. However, in order to reposition the illumination unit independently by rotating the holding arm, it is necessary to release the locking mechanism beforehand. Therefore, a user of the device must consider whether the locking mechanism is enabled or released every time rotating the arm, which is disadvantageously complicated.

In case where the rotation of the holding arm offers a high degree of freedom to the excursion of the illumination unit, the glare of illumination in the camera head can be corrected or reduced through the repositioning of the illumination unit. Downsizing of the device, however, may introduce some restrictions on location for installing the illumination unit, length of the holding arm of the illumination unit, or the like, and may cause the repositioning of the illumination unit to be insufficient to reduce or correct the glare of illumination in the camera head. Improvement in usability of the device is thus required.

With the foregoing in view, the present invention is purposed to improve usability of an imaging device that images a target object mounted on a table.

SUMMARY OF THE INVENTION

In order to solve at least a part of the problem stated above, an imaging device of the present invention employs an arm support module that rotatably supports a camera holding arm and an illumination unit holding arm on a table such that their degrees of inclinations may be variable with respect to the table. The camera holding arm holds a camera head such that the camera head images an imaging-area of a table on which an imaging-object is laid; whereas the illumination unit holding arm holds an illumination unit such that the illumination unit illuminates a top face area of the table from above the table. Therefore, rotation of the illumination unit holding arm enables the illumination unit to take the following attitudes: an illuminating attitude where the illumination unit illuminates the top face area(the imaging-area) from above the table; and a table side illumination attitude where the illumination unit got close to a top surface of the table. Additionally, rotation of the camera head holding arm enables the camera head to take the following attitudes: an imaging attitude where the camera head images the imaging-area from above the table and a table side camera attitude where the camera head got close to the top surface of the table.

The arm support module that rotatably supports the camera holding arm and the illumination unit holding arm, and holds these rotated holding arms at their respective inclined positions after rotations. This arrangement not only enables the camera head and the illumination unit to keep the above-stated respective positions, but also enables, for example, the illumination unit to keep any position in its partway from the illuminating attitude to the table side illumination unit attitude or in its partway from the table side illumination unit attitude to the illuminating attitude. The same applies to the camera head.

In the case where the camera holding arm rotates, the arm support module uses a rotating mechanism provided therein to generate a movement of the illumination unit holding arm that causes the illumination unit holding arm to rotate along with the camera holding arm. Therefore, in the case where the illumination unit takes the illuminating attitude described above and the camera head takes the imaging attitude described above, rotating the camera holding arm and bringing the camera head into the table side camera attitude always generates a movement of the illumination unit holding arm that also brings the illumination unit close to the table side illumination attitude. On the other hand, in the case where the illumination unit takes the table side illumination attitude and the camera head takes the table side camera attitude, rotating the camera holding arm and bringing the camera head into the imaging attitude always generates a movement of the illumination unit that also brings the illumination unit close to the illuminating attitude. This arrangement eliminates the need for a user to carry out or give consideration to operations such as releasing or disabling a lock between the camera holding arm and the illumination unit holding arm at the time of shifting the attitude as described above. The usability of the device is thus improved.

As for the illumination unit holding arm, however, the arm support module in the present invention enables the illumination unit holding arm to rotate independently with no accompanying change in the inclined position of the camera holding arm. This arrangement eliminates the need for a user to carry out or give consideration to operations such as releasing or disabling the lock between the camera holding arm and the illumination unit holding arm at the time of repositioning the illumination unit. The usability of the device is thus improved.

The imaging device of the present invention described above may be implemented in a variety of aspects. For example, the rotating mechanism that causes the described rotations of the arms may include: a first shaft that rotatably and axially supports the camera holding arm with respect to the table, a first adjustment module that adjusts frictional force that is generated when the camera holding arm rotates about the first shaft; a second shaft that is concentric with the first shaft and rotates along with the camera holding arm, the second shaft rotatably and axially supporting the illumination unit holding arm; and a second adjustment module that adjusts frictional force that is generated when the illumination unit holding arm rotates about the second shaft. The first adjustment module may adjust the frictional force to a level that overcomes the frictional force adjusted by the second adjustment module.

When the camera holding arm rotates about the first shaft, the second shaft concentric with the first shaft rotates along with the camera holding arm so that the illumination unit holding arm axially supported by the second shaft also rotates along with the second shaft. To the contrary, when the illumination unit holding arm rotates about the second shaft, since the frictional forces are adjusted to different levels as described above, the illumination unit holding arm rotates about the second shaft independently with no accompanying rotation of the camera holding arm. Therefore, only a simple and convenient configuration for arm support and frictional force adjustment is required to achieve the above-described rotations of the camera holding arm and the illumination unit holding arm.

On the basis of the above-described configuration that improves the usability of the device, the present invention may also adopt the following configuration. For example, a side wall that surrounds the table and a recess that notches the table top surface; connector terminals for connections with external devices may be provided within the recess; and a cover that covers the recess of the table top surface may be provided to the table such that the cover and the table become substantially coplanar. This arrangement can provide the following advantages.

In order to meet demands for transmission and reception of image signals between an imaging device and external devices, control of an imaging device externally from external devices, and the like, it is recently required to provide an imaging device with connector terminals for connections with a variety of external devices. Such connector terminals are typically placed on a table of the imaging device, because of the table-equipped configuration of the device. Connectors connected to the connector terminals, however, protrude outward from the table and increase space for installing the device by just that much. This interferes with reduction of the space for installing the device.

The arrangement described above, however, allows for both the attachment of the connector terminals in the device and the reduction of the space for installing the device. That is, the connector terminals are configured to be attachable within the recess that is provided on the sidewall around the table, and then, the cover is provided to cover the recess of the table top surface such that the top surface of the cover can form a part of the table top surface. It is thus only under the cover that the connectors connected to the connector terminals protrude outward. This arrangement assures compatibility between the reduction of the space for installing the device and the attachment of the connector terminals in the device.

The cover may alternatively be attached to the table such that the cover opens and closes the recess of the table top surface. In this way, the connectors can be attached to or detached from the connector terminals while the cover is kept opened, which makes the attachment and detachment of the connectors simple and convenient.

Alternatively, the table may be a rectangular table, and the arm support module may rotatably support the camera holding arm and the illumination unit holding arm at a corner of the table that is located lateral to the recess of the table top surface. In this way, another corner of the table that is opposed to the support corner of the arm support module across the recess can be used as a location for setting an imaging-object, or as a space for resetting the imaging-object for purpose of changing which portion of the imaging-object is to be imaged.

In order to solve at least a part of the problems stated above, the present invention provides an imaging device of another configuration having a camera head that images an imaging-area of a table which an imaging-object is laid on; and an illumination unit that illuminates an area on the table. And the table includes a table body; a stage member that is incorporated in the table body and forms a top surface of the table; and an inclining mechanism that inclines the stage member with respect to the table body.

In the imaging device of the present invention with such another configuration, inclining the stage member by using the inclining mechanism simultaneously varies the following angles: an illuminating angle of light (illumination light) that is irradiated by the illumination unit toward the table top surface and the target object; and an angle of optical axis of the camera head with respect to the target object. If the illumination light that reflected off the table top surface or the target object glares into the camera head at the time the stage member is not yet inclined by the inclining mechanism, then inclining the stage member by using the inclining mechanism can easily divert the light path of the reflected light away from the camera head. This arrangement allows for reduction or correction of the glare of illumination in the camera head with ease as well as attains improvement in the usability of the device, even in case where some restrictions were introduced on location for installing the illumination unit, length of the holding arm of the illumination unit, or the like, due to e.g. the downsizing of the device.

In this case, the inclining mechanism can incline the stage member in a manner that elevates one side of the stage member, on which the illumination unit is located for purpose of illuminating the target object. This operation diverts the light path of the reflected light away from the camera head in a direction receding from the illumination unit, and thereby allows for improvement of effectiveness in reducing or correcting the glare of illumination in the camera head.

DESCRIPTION OF THE PREFERRED EMBODIMENTS

Figure 1:
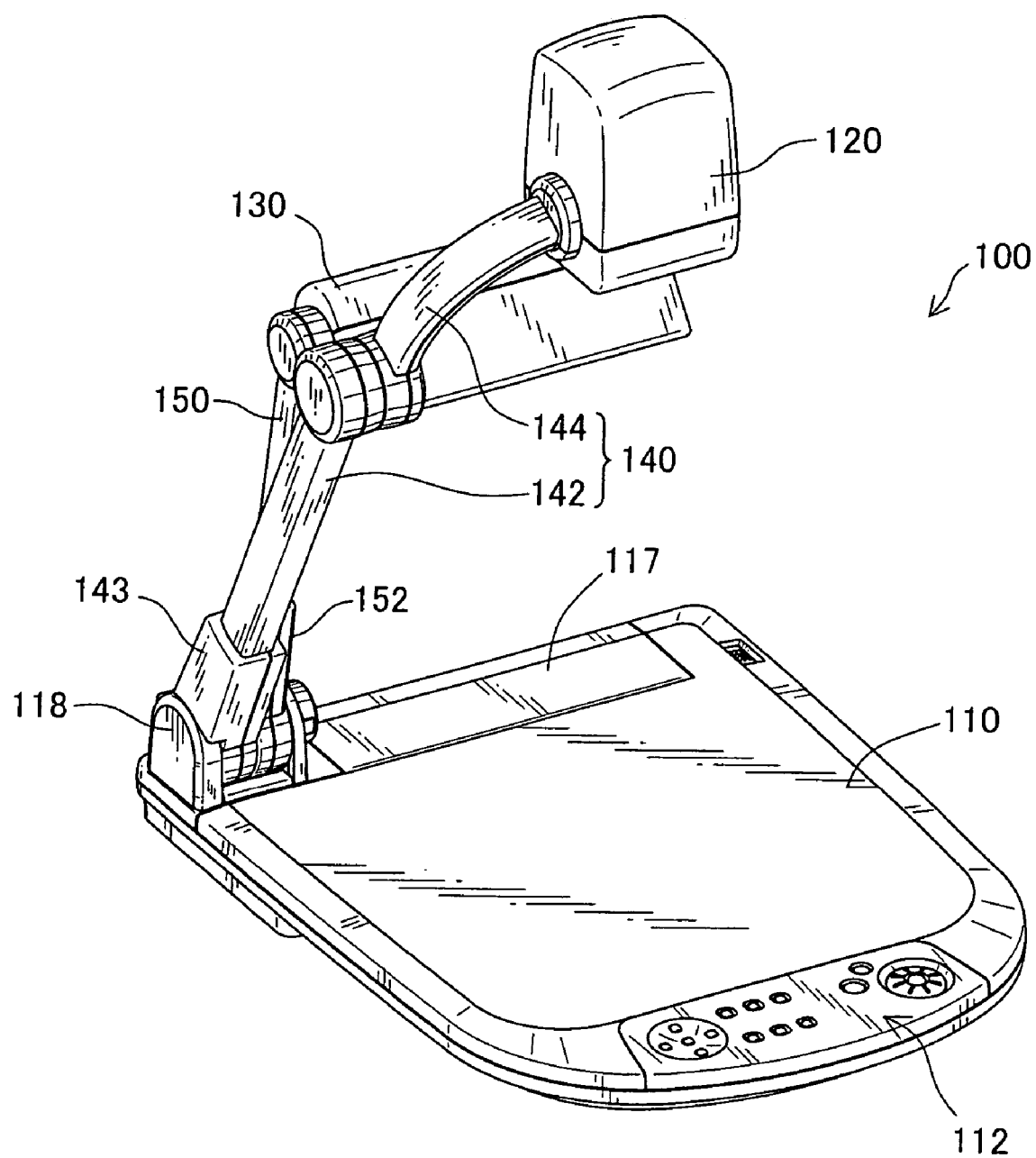
FIG. 1 is a perspective view of an imaging device 100 of an embodiment.
Figure 2:
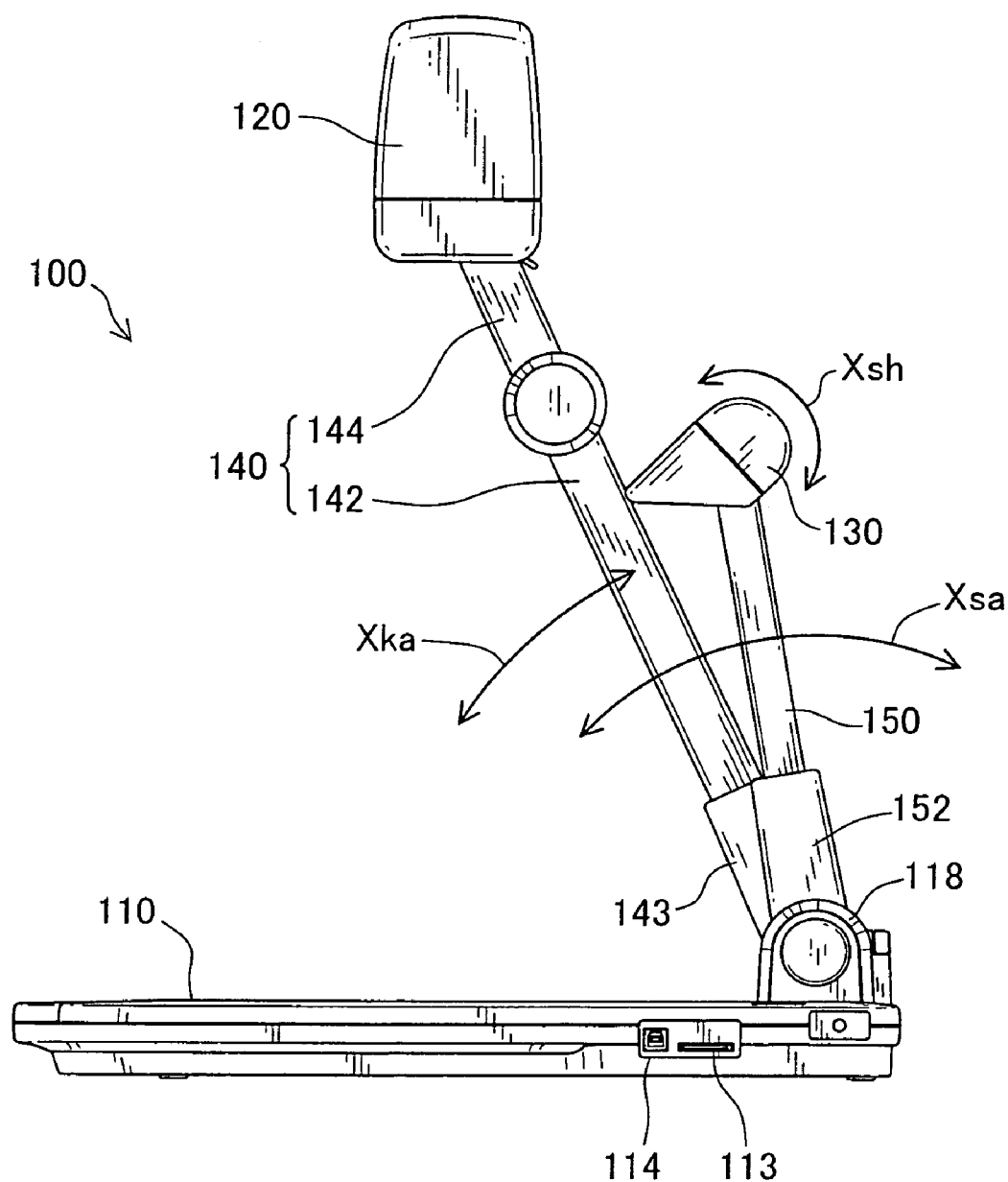
FIG. 2 is a right side view of the imaging device 100.
Figure 3:
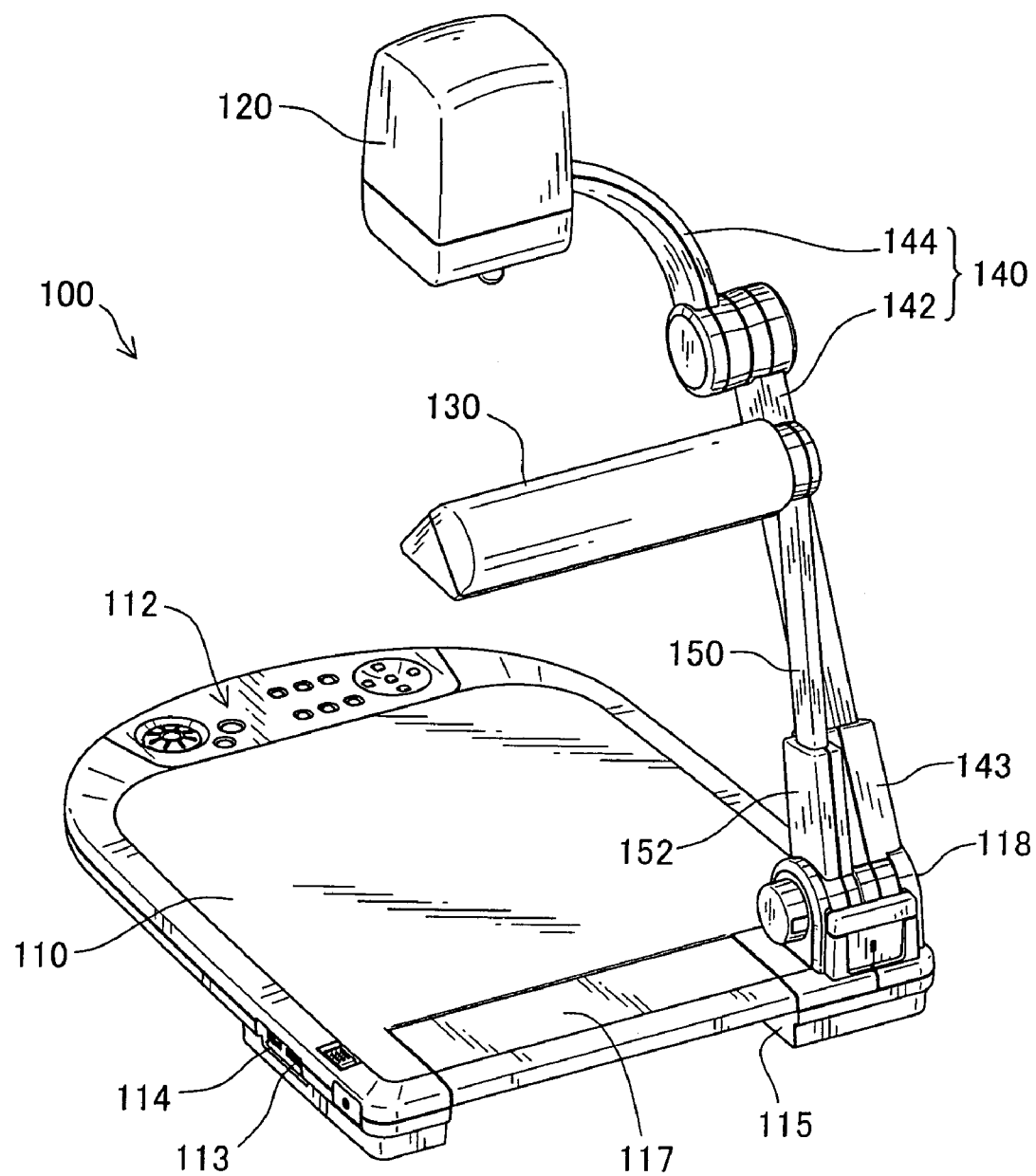
FIG. 3 is a rear perspective view of the imaging device 100.

The following describes modes for embodying the present invention in terms of examples based on drawings. FIG. 1 is a perspective view of an imaging device 100 of an embodiment; FIG. 2 is a right side view of the imaging device 100; FIG. 3 is a rear perspective view of the imaging device 100; and FIG. 4 is a rear perspective view of the imaging device 100, where a cover is opened.

As shown in the drawings, the imaging device 100 includes: a table 110 on which a target object is mounted; a camera head 120 that images the target object (not shown) on the table 110; and an illumination unit 130 that illuminates the target object on the table 110. The table 110 is a square-shaped tablet with a rounded fore side, and has a group of switches 112 on top of the fore side and a memory card slot mechanism 113 and an USB (Universal Serial Bus) terminal 114 at right-rear end of a side wall. The group of switches 112 includes switches for settings such as zoom, auto-focus, iris, and white balance as well as switches such as for setting device functions or for writing memory data. However, details of these switches are not described herein, for they are not immediately related to the scope of the present invention.

Figure 4:
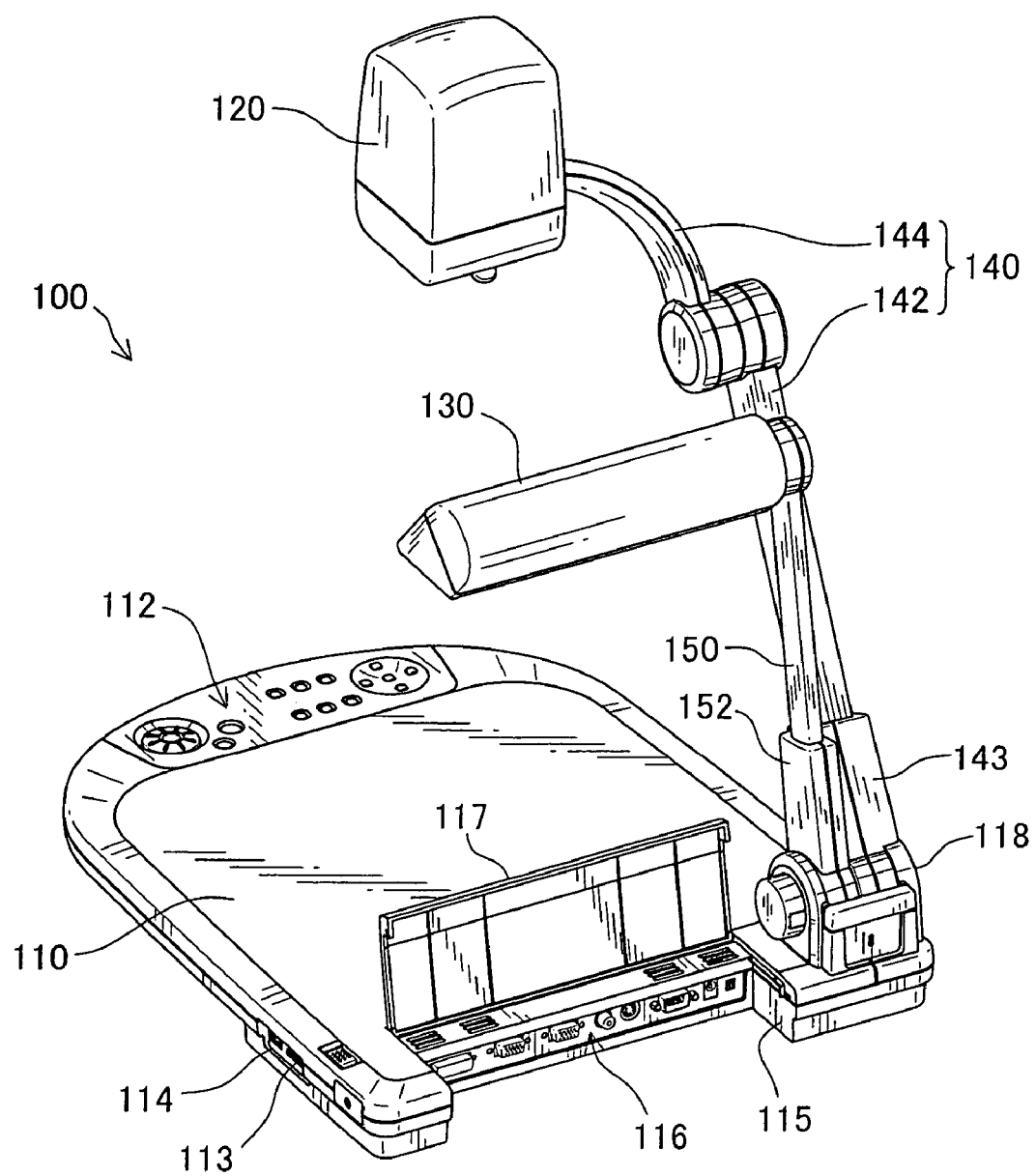
FIG. 4 is a rear perspective view of the imaging device 100, where a cover is opened.

As shown in FIG. 3 and FIG. 4, the table 110 further includes: a recess 115 that notches a top surface of the table at rear end of the side wall around the table; and a group of connectors 116 for connection with external devices (which will be described later) at inner end of the recess. The table 110 further includes a cover 117 at the rear end in an openable and closable manner and uses the cover 117 to cover the notched portion of the table top surface within the recess 110. The cover 117 opens and closes like a flap, and in a closed state shown in FIG. 3, becomes substantially coplanar with the table top surface and makes the cover surface continuous with the table top surface.

The camera head 120 is held with respect to the table 110 by means of a camera holding arm 140. The camera holding arm 140 includes a table side arm 142 and a camera side arm 144, and is rotatably held to the table 110 at a base 143 of the table side arm 142. The camera side arm 144 is fixedly connected with the camera head 120 and is rotatably connected with the table side arm 142. The camera head 120, therefore, can rotate at leading end of the table side arm 142 in a manner integral with the camera side arm 144.

The illumination unit 130 is held with respect to the table 110 by means of an illumination unit holding arm 150. The illumination unit holding arm 150 is rotatably held to the table 110 at its base 152 and rotatably holds the illumination unit 130 at its leading end.

Figure 5:
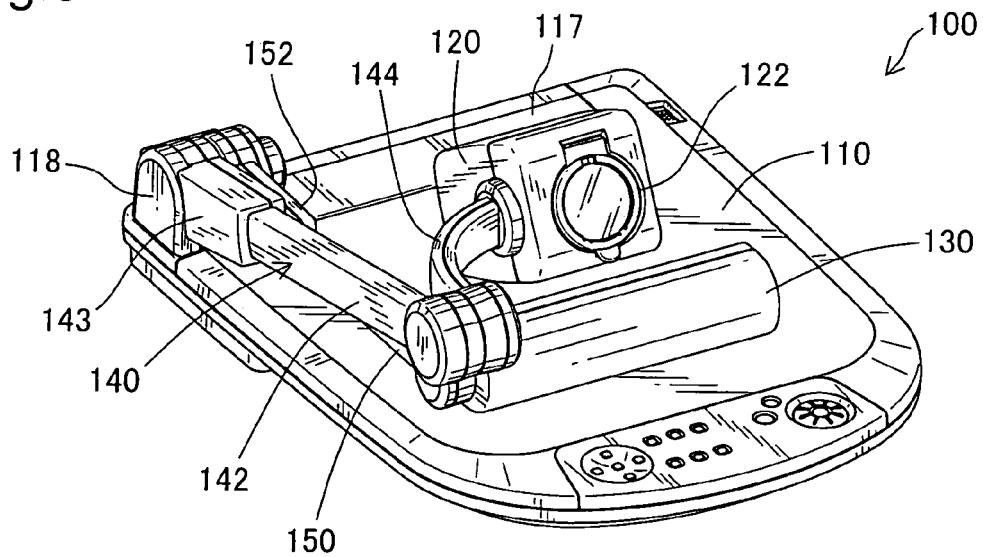
FIG. 5 is a perspective view of the imaging device 100 at its storage, carriage, or custody, where both of a camera holding arm 140 and an illumination unit holding arm 150 are rotated into a position at a table side.
Figure 6:
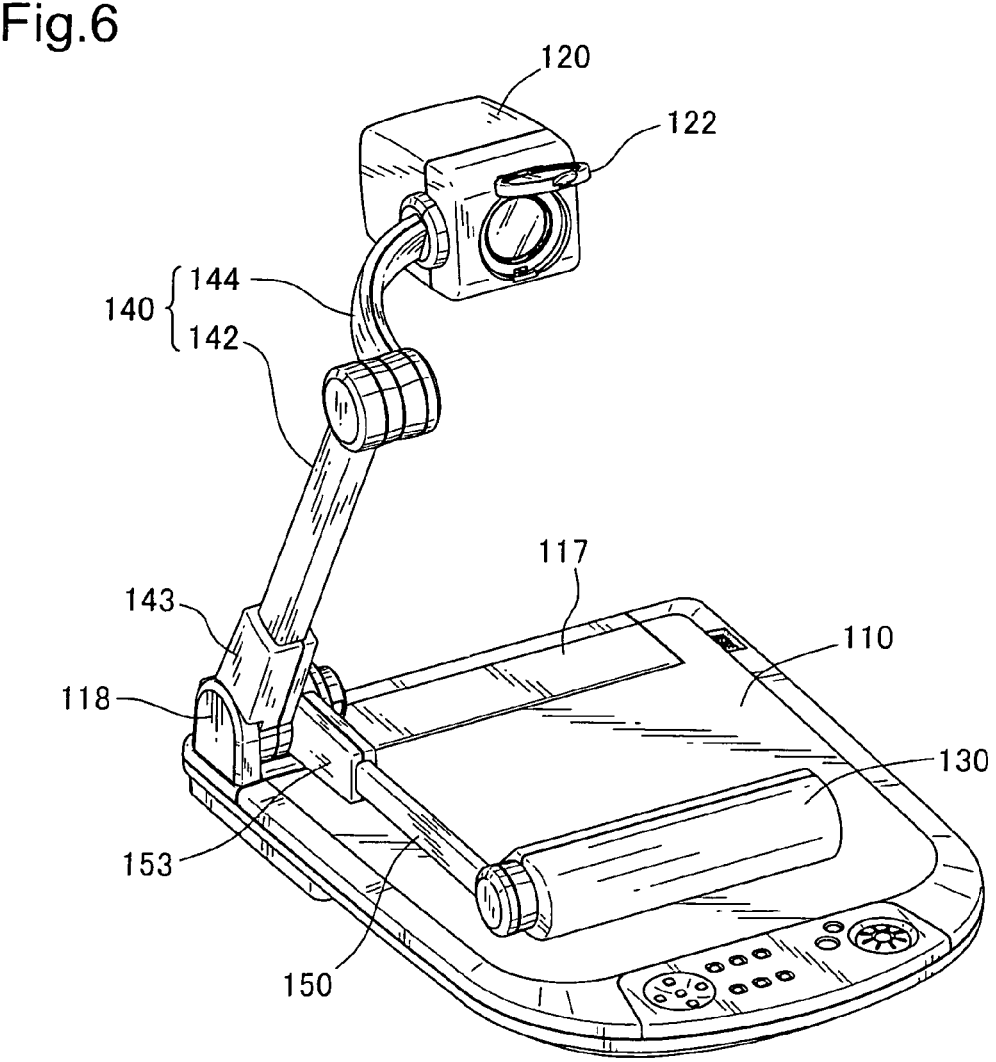
FIG. 6 is a perspective view of the imaging device in a mode of imaging frontward of the device.
Figure 7:
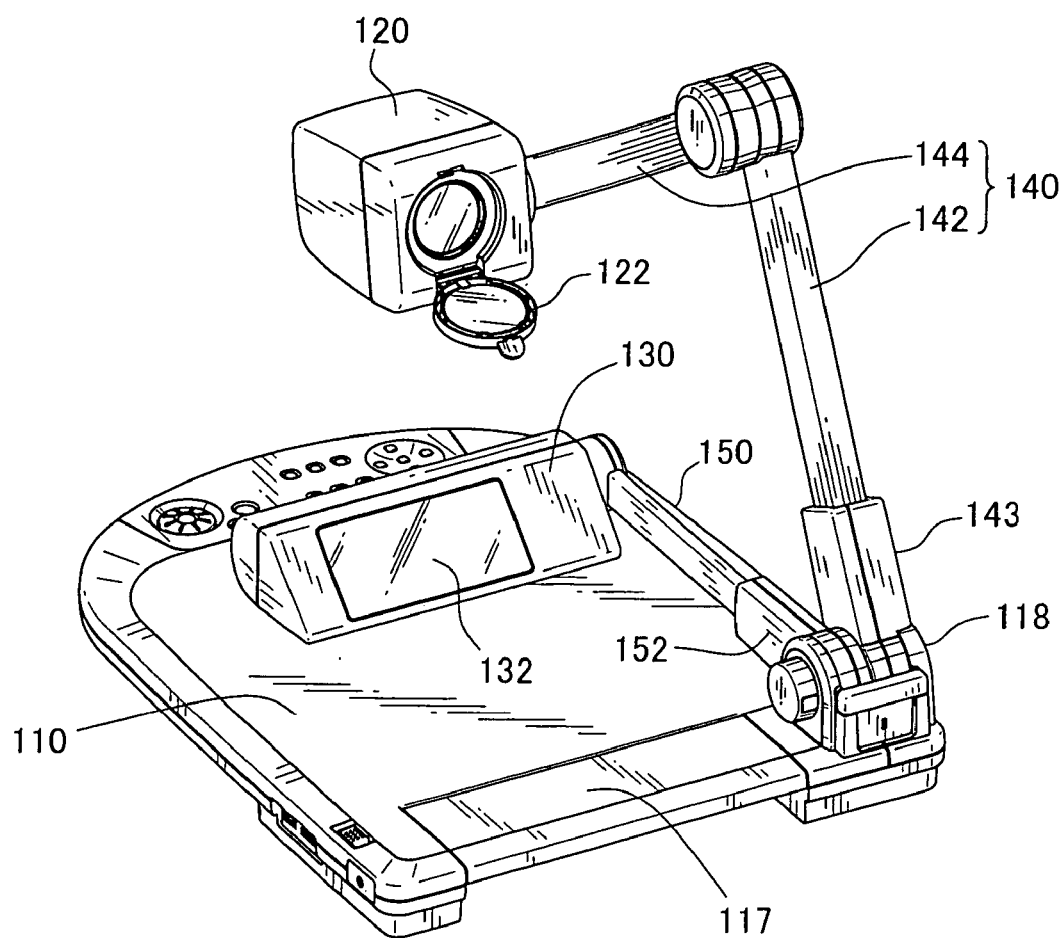
FIG. 7 is a perspective view of the imaging device in a mode of imaging rearward of the device.

The camera holding arm 140 and the illumination unit holding arm 150 are rotatably and coaxially supported by an elevated portion 118 that is located at an inner-left corner of the table 110, and are coaxially rotated with respect to the table 110 to vary their degrees of inclinations with respect to the table 110. Having these rotatably and coaxially supported arms, the imaging device 100 can take various modes as the arms rotate. The following describes the various modes that can be taken by the imaging device 100, before describing the mechanism for rotatably and axially supporting the arms. FIG. 5 is a perspective view of the imaging device 100 in its storage, carriage, or custody, where both of the camera holding arm 140 and the illumination unit holding arm 150 are rotated into a position at a table side; FIG. 6 is a perspective view of the imaging device 100 in a mode of imaging frontward of the device; and FIG. 7 is a perspective view of the imaging device 100 in a mode of imaging rearward of the device.

As can be seen from the above details of how the arms and the illumination unit 130 are axially supported, the camera holding arm 140 is rotated to vary its degree of inclination with respect to the table 110, as indicated by an arrow Xka in FIG. 2, and is rotatable from the mode shown in FIG. 2, FIG. 1, or FIG. 3 to a mode where camera head 120 gets close to the top surface of the table 110. At the time of imaging the target object mounted on the table 110, the camera head 120 takes an attitude (imaging attitude) shown in FIGS. 1 to 3 and images the target object from above the table. It should be noted herein that, when the camera head 120 takes this imaging attitude, a stopper of the support mechanism described below regulates the rotation of the camera holding arm 140 and thereby maintains the camera holding arm 140 at a maximum degree of inclination (maximum inclination) with respect to the table 110.

The illumination unit holding arm 150 is rotated to vary its degree of inclination with respect to the table 110, as indicated by an arrow Xsa in FIG. 2, and is rotatable from the mode shown in FIG. 2 to a mode where the illumination unit 130 gets close to the top surface of the table 110. The illumination unit holding arm 150 is also rotatable to a mode where the illumination unit 130 reaches a position posterior to the position shown in FIG. 2. The illumination unit 130 is rotated at the connection with the illumination unit holding arm 150, in a manner indicated by an arrow Xsh in FIG. 2. At the time the target object mounted on the table 110 is imaged, the illumination unit holding arm 150 is located posterior to the camera holding arm 140 and the illumination unit 130 generally takes an attitude posterior to the camera head 120 (illuminating attitude) shown in FIG. 2. The illumination unit 130 in this attitude illuminates the target object mounted on the table 110 obliquely from above the table.

Besides the mode of imaging the target object on the table top surface, the imaging device 100 is also configurable into a mode of storage shown in FIG. 5. In this mode, the illumination unit holding arm 150 is rotated to minimize its degree of inclination with respect to the table 110, so that the illumination unit 130 gets close to the top surface of the table 110 and takes a table side illumination unit attitude where an outer wall of a casing of the illumination unit 130 is laid over the table 110. As for the camera holding arm 140, the table side arm 140 is rotated to minimize its degree of inclination with respect to the table 110 and the camera side arm 144 is rotated approximately an angle of 180 degrees at the connection with the table side arm 142, so that the camera side arm 144 and the table side arm 142 may appear overlapped from a lateral view. These rotations of the arms enable the camera head 120 to take a table side camera head attitude where it gets close to the top surface of the table 110, with a closeup lens 122 at fore side facing obliquely upward.

In other words, by going through the rotations of the camera holding arm 140 and the illumination unit holding arm 150 as described above, the camera head 120 shifts the attitude from the previously described imaging attitude shown in FIGS. 1 to 3 to the table side camera head attitude shown in FIG. 5 and holds itself in the attitude. The same applies to the illumination unit 130, which shifts the attitude from the previously described illuminating attitude shown in FIGS. 1 to 3 to the table side illumination unit attitude shown in FIG. 5 and holds itself in the attitude.

The imaging device 100 also takes a mode of frontward imaging shown in FIG. 6. In this mode, the camera head holding arm 140 rotates the camera side arm 142 into a position at the rear side of the device while keeping the table side arm 142 in the previously described maximum inclination. Therefore, the camera head 120 becomes frontward-faced and images the target object at the front side of the device. The imaging device 100 also takes a mode of rearward imaging shown in FIG. 7. In this mode, the camera head holding arm 140 rotates the camera side arm 142 into a position at the front side of the device while keeping the table side arm 142 also in the maximum inclination. Therefore, the camera head 120 becomes rearward-faced and images the target object at the rear side of the device.

The camera head 120 in the mode of frontward imaging or rearward imaging may alternatively be not equipped with the closeup lens 122. In the modes of frontward imaging and rearward imaging, the rotated position of the camera side arm 144 with respect to the table side arm 142 can be defined by a restraint mechanism (not shown) that is incorporated in the rotatable connection between the camera side arm 144 and the table side arm 142.

In case where the camera head 120 is in the mode of frontward imaging or rearward imaging, the illumination unit 130 can take the attitude where it is laid over the table 110, as shown in FIG. 6 and FIG. 7. The illumination unit 130, however, may arbitrarily be adjusted into any other attitude as long as it does not interfere with the frontward imaging or rearward imaging. The illumination unit 130 has a slanted area for irradiation of illumination light and the area includes a window 132 for transmission of the irradiated illumination light. Therefore, in the mode of rearward imaging shown in FIG. 7, the illumination unit 130 can be used for the target object both as an illumination light source and as a supplementary light source.

Figure 8:
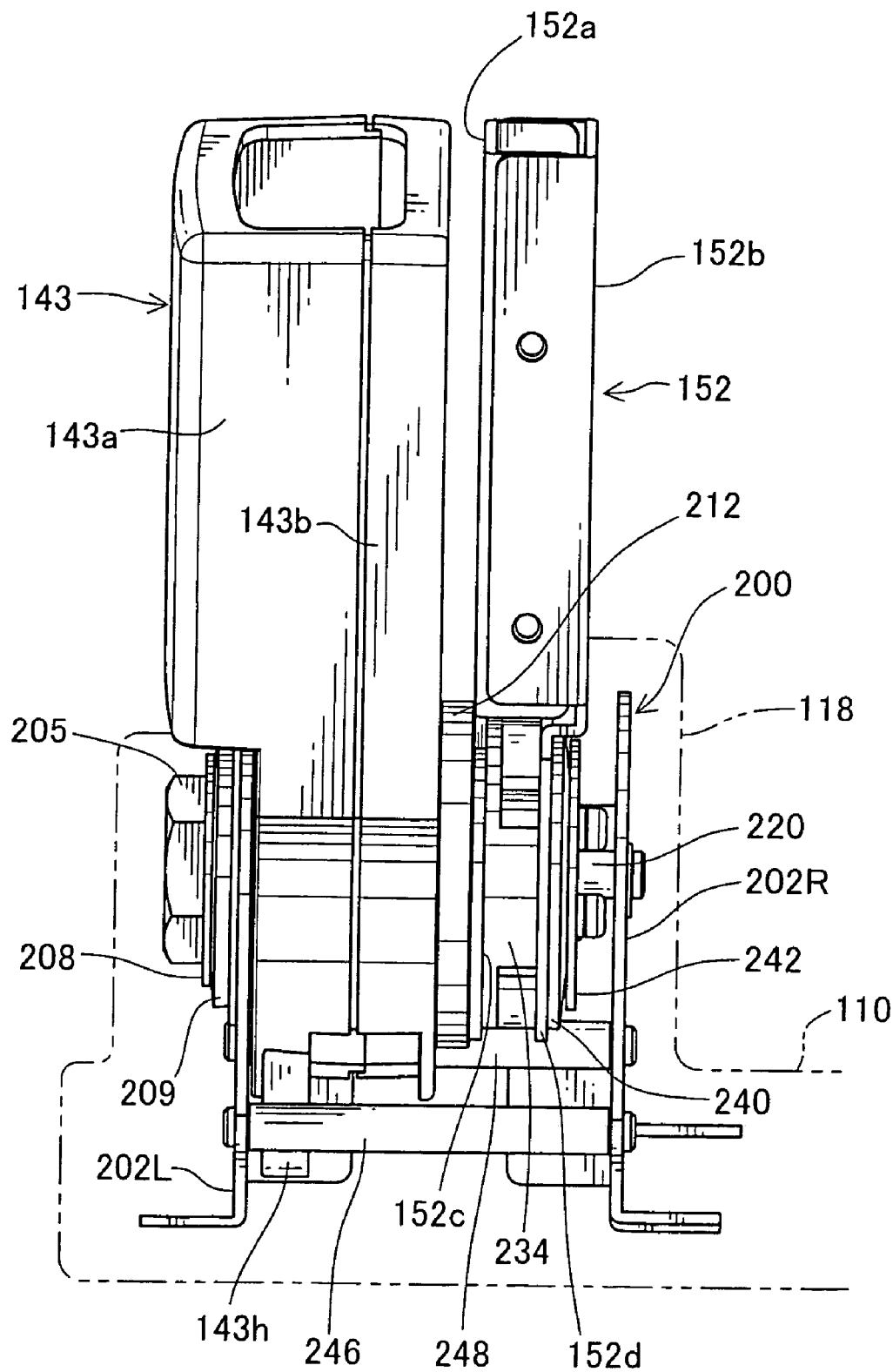
FIG. 8 is a schematic view where an arm support mechanism in an elevated portion 118 is depicted with a cover removed to facilitate description.
Figure 9:
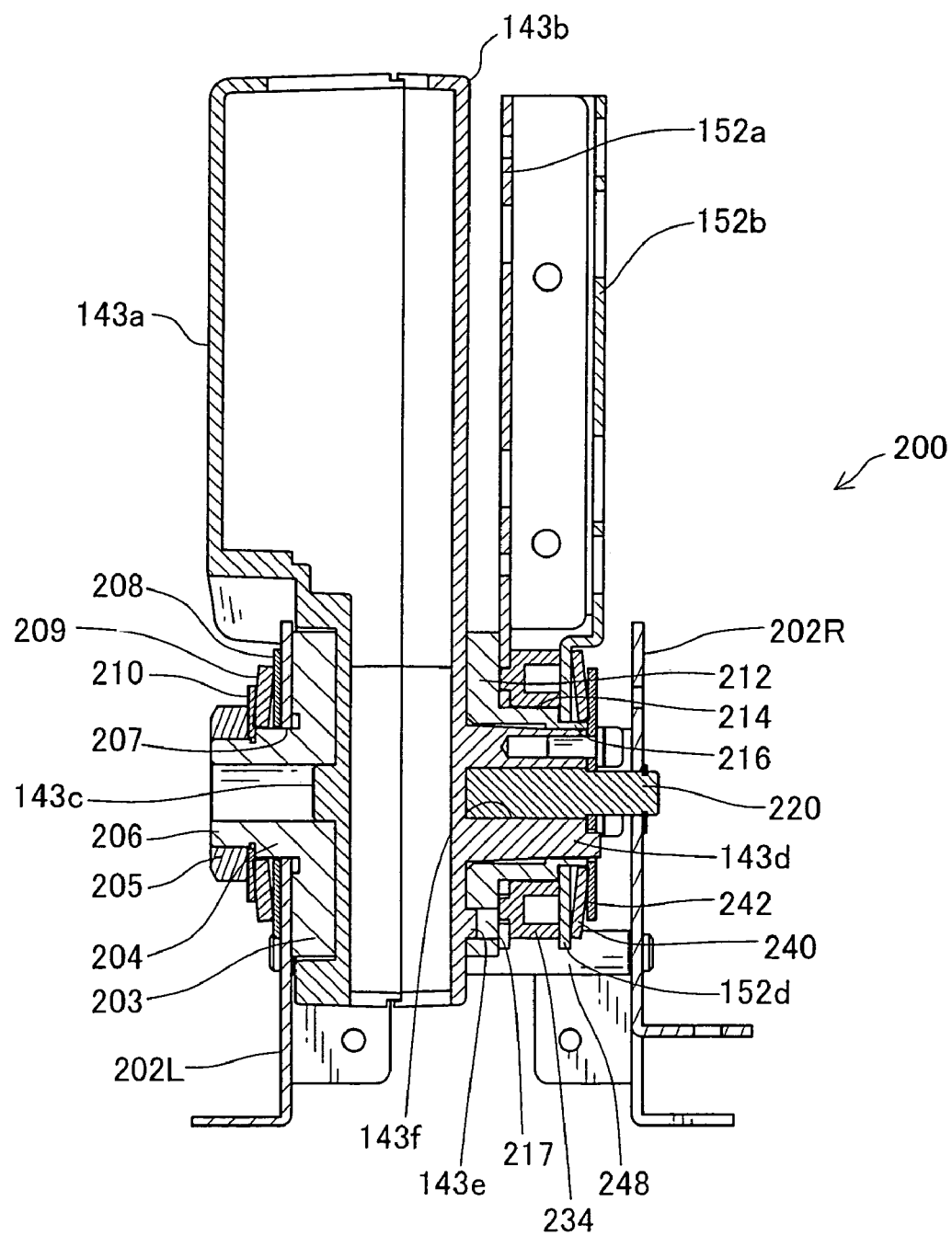
FIG. 9 is a cross-sectional view where the arm support mechanism 200 is depicted along a vertical line of FIG. 8 with an axis of the arm support mechanism contained therein.
Figure 10:
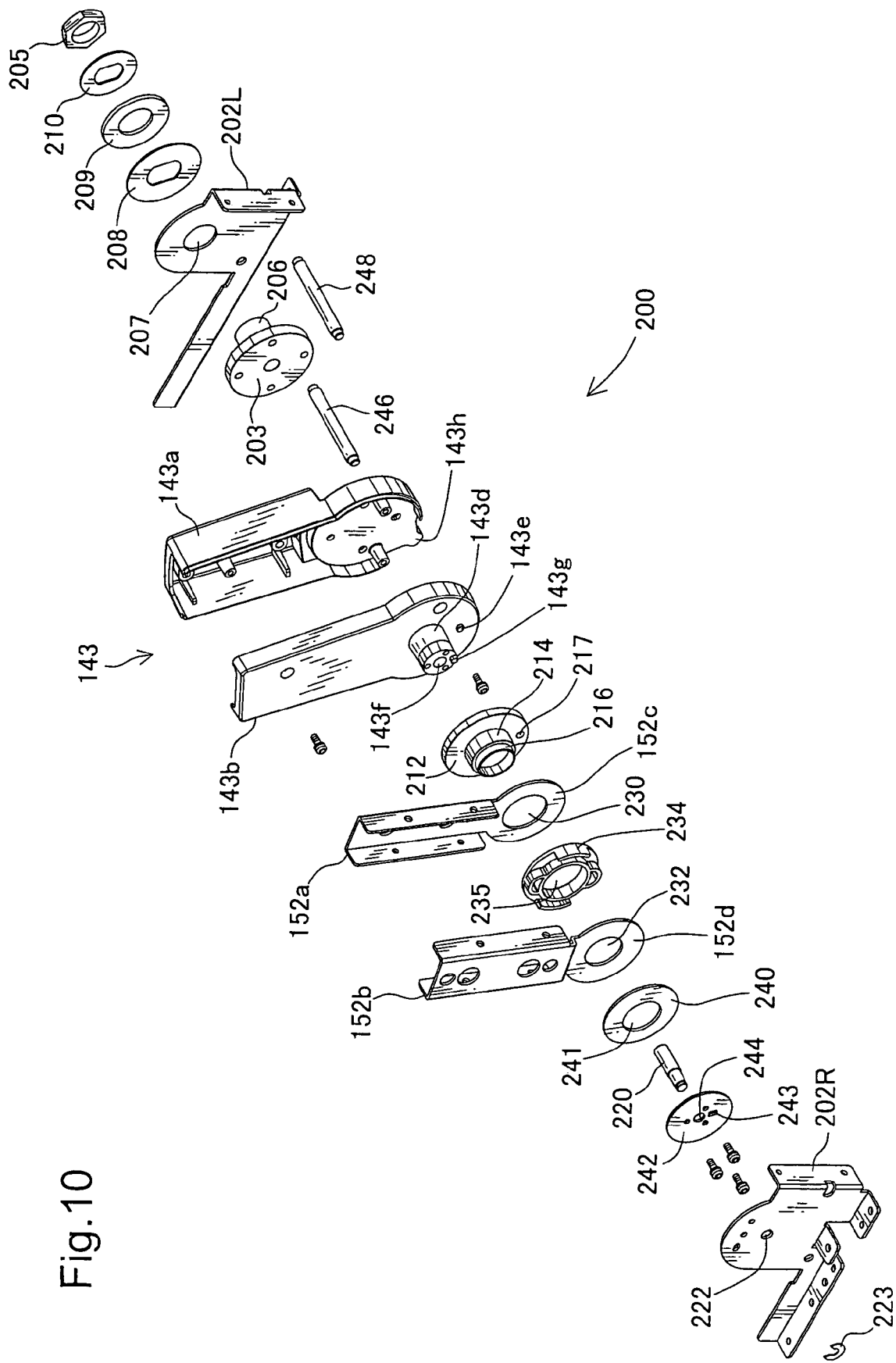
FIG. 10 is an exploded perspective view where parts of the arm support mechanism 200 are dismounted and depicted from back side of the device.

The following describes the mechanism for axially supporting the camera holding arm 140 and the illumination unit holding arm 150. FIG. 8 is a schematic view where an arm support mechanism 200 in the elevated portion 118 is depicted with a cover removed to facilitate description; FIG. 9 is a cross-sectional view where the arm support mechanism 200 is depicted along a vertical line of FIG. 8 with an axis of the arm support mechanism contained therein; and FIG. 10 is an exploded perspective view where parts of the arm support mechanism 200 are dismounted and depicted from back side of the device.

As shown in these drawings, the arm support mechanism 200 includes right and left plates 202L, 202R that are fixed to a bony framework (not shown) of the table 110 in an opposing manner, and holds the camera holding arm 140 (specifically, the base 143) and the illumination unit holding arm 150 (specifically, the base 152) between the plates. The base 143 of the camera holding arm 140 is configured by a first part 143a and a second part 143b made of aluminum die-casts, which are positioned with respect to each another and then joined together. It should be noted herein that, since FIG. 10 is a view depicted from the back side of the device, the parts are showed in a reversed order when compared to those shown in FIG. 8 and FIG. 9. The same applies to the other parts that will be described below.

The first part 143a has a pin boss 143c at lower end. A first support shaft main member 203 is positioned and fixed to the boss by means of a bolt (not shown). The first support shaft main member 203 has a first main shaft 204 at center, the end of which composing a screw thread shaft 206 for a nut 205. The first main shaft 204 of the first support shaft main member 203 is fitted into a support hole 207 formed in the plate 202L and thereby fixes the first support shaft main member 203 to the plate 202L with a plain washer 208, coned disc spring 209, and a plain washer 210 interposed therebetween. The base 143, therefore, is axially supported by the first main shaft 204 of the first support shaft main member 203 on the side of the first part 143a. In such arrangement, frictional force that is generated at the time the first main shaft 204 rotates in the support hole 207, that is, frictional force during rotation of the camera holding arm 140 is adjusted by calibrating deflection level of the coned disc spring 209 by means of the nut 205.

The second part 143b has a columnar projection 143d on the other side of the pin boss 143c of the first part 143a. A second support shaft member 212 is positioned and attached to the columnar projection 143d. Details of how the second support shaft member 212 is fixed will be described later. The second support shaft member 212 has a second support shaft 214 at center, the end of which composing a shaft portion 216 for ensuring a space for fastening the base 152. The second support shaft member 212 also has a positioning opening 217 on a flange portion. A projection 143e of the second part 143b is fitted into the opening 217, so that the second support shaft member 212 can be positioned to and integrated with the second part 143b and thus the base 143 (camera holding arm 140).

The attachment of the second support shaft member 212 and the first support shaft main member 203 to the base 143 is adjusted such that the second support shaft 214 of the second support shaft member 212 and the first main shaft 204 of the first support shaft main member 203 become coaxial with each other. Therefore, the second support shaft 214 of the second support shaft member 212 becomes concentric with the first main shaft 204 and enables the second support shaft member 212 to rotate (turn) in integration with the base 143 (camera holding arm 140).

In this case, the columnar projection 143d has a pin-fitting opening 143f at center of end face and has a first sub-shaft pin 220 fitted and fixed therein. This makes the first sub-shaft pin 220 coaxial with the first main shaft 204. The end of the first sub-shaft pin 220 is fitted into a support hole 222 of the plate 202R, and then an E-shaped snap ring 223 is used to prevent the pin 220 from slipped off in the axial direction. The support hole 207 of the left plate 202L and the support hole 222 of the right plate 202R are coaxial with each other. The base 143 (camera holding arm 140), therefore, is axially supported by these coaxial first main shaft 204 and first sub-shaft pin 220 from both sides of the base and rotates about this shaft. On that condition, the frictional force during such rotation can be controlled by adjusting the deflection level of the coned disc spring 209, which is achieved by calibrating interference of the nut 205.

The base 152 of the illumination unit holding arm 150 is configured by a first part 153a and a second part 153b made of press mold steel plates, which are positioned with respect to each another and then jointed together. Through holes 230, 232 are provided at respective disc portions 152c, 152d at lower ends of the first and second parts, and a resin spacer 234 is sandwiched between the respective disc portions. Therefore, the base 152 of the illumination unit holding arm 150 is attached to the second support shaft member 212 of the base 143 of the camera holding arm 140 with the spacer 234 sandwiched therebetween.

That is to say, the first part 152a is attached to the second support shaft member 212 such that the second support shaft 214 is fitted into the through hole 230 of the first part 152a, and then the spacer 234 is laid over the disc portion 152c such that the second support shaft 214 is fitted into a through hole 235 of the spacer 234. Thereafter, the second part 152b is attached such that the disc portion 152d is laid over the spacer 234 and the shaft portion 216 of the second support shaft member 212 is fitted into the through hole 232. Therefore, the illumination unit holding arm 150 is, more specifically the first part 152a and the second part 152b are, axially supported by the second support shaft 214 and the shaft portion 216 of the second support shaft member 212 from both sides of the base and rotates about this shaft in a manner that prevents the disc portions of the parts from being deformed due to the fastening that will be described later. Since the second support shaft 214 and the shaft portion 216 are concentric with the first main shaft 204 and the first sub-shaft pin 220, i.e. the rotating shaft of the camera holding arm 140, the camera holding arm 140 and the illumination unit holding arm 150 are coaxially and rotatably supported with respect to the table 110 such that their degrees of inclinations may be variable with respect to the table 110.

In order to adjust the frictional force during rotation of the illumination unit holding arm 150 (base 152) that is rotatably and axially supported as described above, the arm support mechanism 200 provides a coned disc spring 240 that is laid over and fixed to the disc portion 152d of the second part 152b by means of a plain washer 242. That is, the shaft portion 216 of the second support shaft member 212 is inserted into a through hole 241 of the coned disc spring 240, and then the plain washer 242 is fastened on the side of the columnar projection 143d of the second part 143b by means of three screw threads shown in the drawing. On that condition, the frictional force at the time the base 152 that is made by combining the first part 152a and the second part 152b (i.e. the illumination unit holding arm 150) rotates about the coaxial second support shaft 214 and shaft portion 216 of the second support shaft member 212 that is integrated with the base 143 of the camera holding arm 140, that is, the frictional force during rotation of the illumination unit holding arm 150 can be controlled by adjusting deflection level of the coned disc spring 240 by means of these screw threads. It should be noted herein that the plain washer 242 has three holes for receiving screw threads of a same pitch as well as another opening 243. The plain washer 242 is positioned with respect to the columnar projection 143d by fitting a projection 143g on the end face of the columnar projection 143d into the opening 243 and also fitting a reduced diameter portion of the first sub-shaft pin 220 into a central through hole 244.

In the present embodiment, the frictional force during rotation of the illumination unit holding arm 150 after the adjustment of the deflection level of the coned disc spring 240 is controlled to be smaller than the frictional force during rotation of the camera holding arm 140 after the adjustment of the deflection level of the coned disc spring 209. The arms are thus rotated as follows.

When the camera holding arm 140 is rotated about the first main shaft 204 and the first sub-shaft pin 220 on the both sides, the second support shaft member 212 that is integrated with the camera holding arm 140 rotates along with the camera holding arm 140. On the other hand, the illumination unit holding arm 150 is held to the second support shaft member 212 by means of the frictional force that arises from the deflection of the coned disc spring 240. When the camera holding arm 140 is rotated, the coned disc spring 240 that generates the above-mentioned frictional force on the illumination unit holding arm 150 exerts a force to press the illumination unit holding arm 150 into integration with the second support shaft member 212 (camera holding arm 140). Therefore, the illumination unit holding arm 150 is always rotated along with the camera holding arm 140.

In case where the illumination unit holding arm 150 is rotated, however, it results as follows. The illumination unit holding arm 150 is rotated against the frictional force that arises from the deflection of the coned disc spring 240 described above. The force that produces rotation of the arm 150 further acts on the camera holding arm 140 that is engaged to the illumination unit holding arm 150 via the second support shaft member 212 and also acts as a force that produces rotation of the arm 140. However, since the camera holding arm 140 is pressed against the first support shaft main member 203 by a force that arises from the deflection of the coned disc spring 209, and the frictional force that arises from the deflection of the coned disc spring 209 is controlled to a level that overcomes the frictional force that arises from the deflection of the coned disc spring 240 (i.e. the force that produces rotation of the illumination unit holding arm 150), the camera holding arm 140 does not change its inclined position with respect to the table 110 and remains at the position. Therefore, only the illumination unit holding arm 150 is solely rotated in this case.

In addition, the arm support mechanism 200 that rotatably and axially supports the arms described above also includes the following configuration for the purpose of defining end-of-rotation attitudes of the camera holding arm 140, i.e. end positions of the arm where the camera head 120 respectively takes the imaging attitude and the table side camera head attitude described above. As shown in FIGS. 8 to 10, the arm support mechanism 200 includes shafts 246, 248 that are bridged across the left plate 202L and the right plate 202R. The shafts not only define a spacing between the plates but also functions to reinforce the plates.

The camera holding arm 140 includes a projection 143h that protrudes from rim of the end of the first part 143a. The projection 143h is located between the shafts 246, 248 that are bridged across the plates. In case where the projection 143h contacts the shaft 246 i.e. the shaft of the near side in FIG. 8, the camera holding arm 140 forms a maximum angle of inclination with respect to the table 110 and holds the camera head 120 in the imaging attitude described above, and remains at the position. On the other hand, when the projection 143h contacts the shaft 248 i.e. the shaft of the far side in FIG. 8, the camera holding arm 140 forms a minimum angle of inclination with respect to the table 110 and holds the camera head 120 in the table side camera head attitude described above, and remains at the position.

Figure 11:
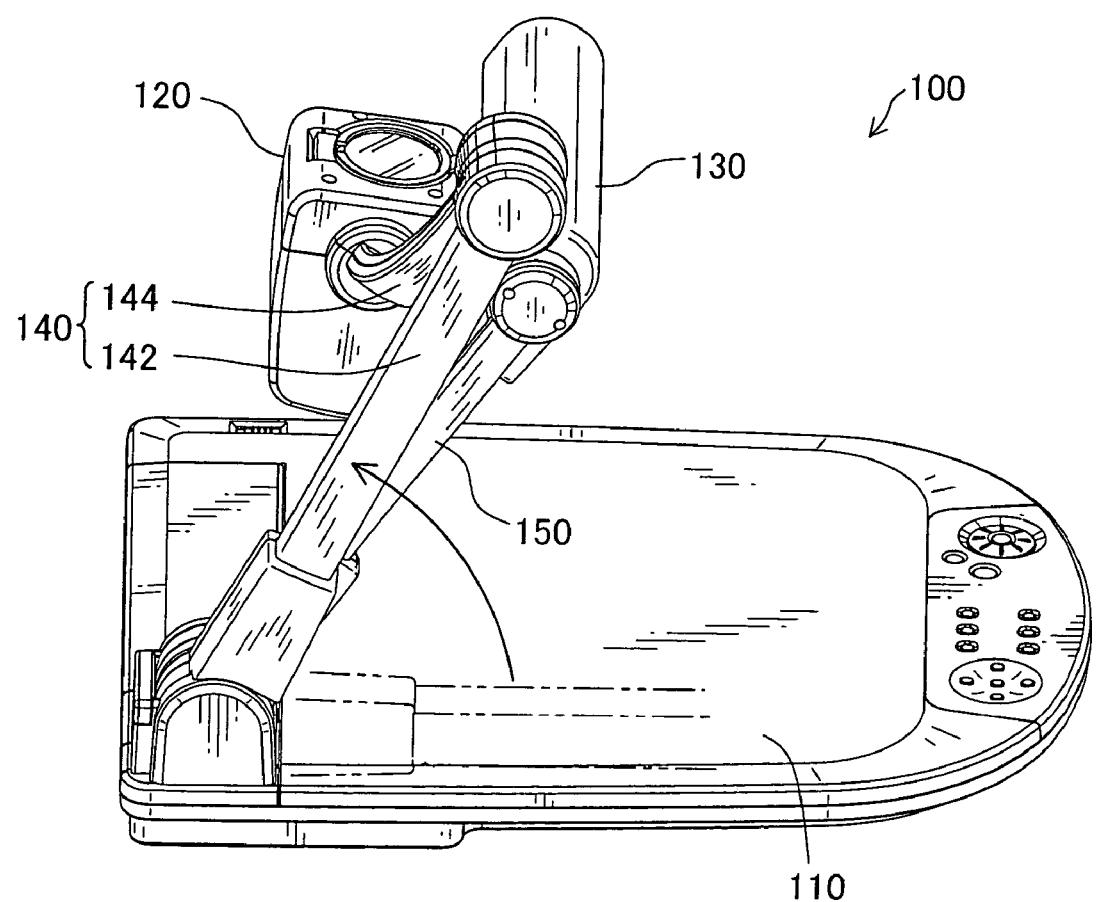
FIG. 11 is a schematic view that describes rotations of the arms shifting from a mode of storage, carriage, or custody of the imaging device 100 shown in FIG. 5 to a mode of imaging a target object.
Figure 12:
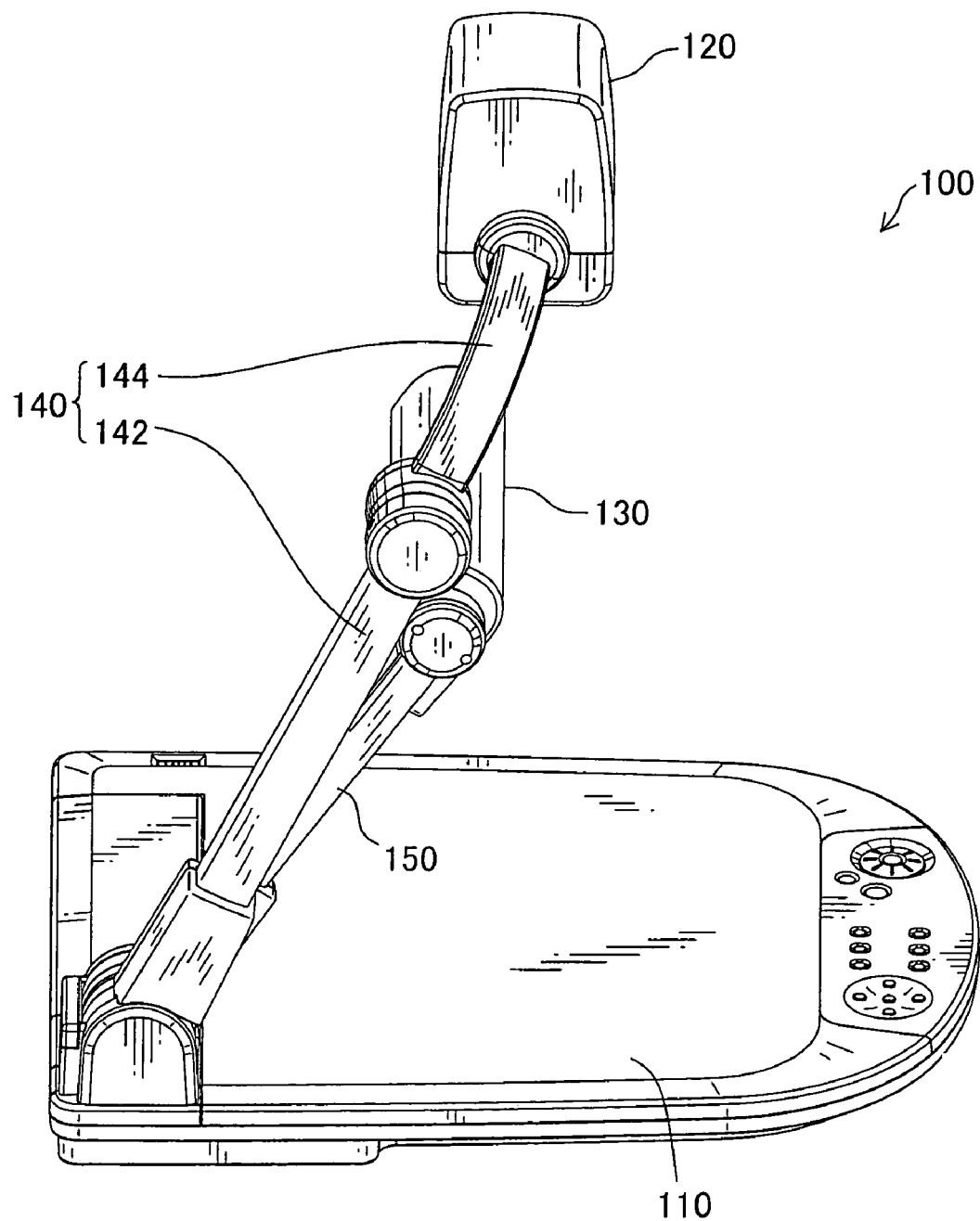
FIG. 12 is a schematic view that shows a mode where the rotations of the arms have progressed from the mode shown in FIG. 11.

The following describes rotations of the arms with respect to a case where the imaging device 100 of the above-described configuration is used. FIG. 11 is a schematic view that describes rotations of the arms shifting from the mode of storage, carriage, or custody of the imaging device 100 shown in FIG. 5 to a mode of imaging a target object; and FIG. 12 is a schematic view that shows a mode where the rotations of the arms have progressed from the mode shown in FIG. 11.

At the time of imaging a target object, the imaging device 100 holds the camera head 120 i.e. a precision instrument above the table 110 (see FIG. 1). At the time of storage, carriage, or custody of the device, however, the imaging device 100 is brought into the mode where both of the camera holding arm 140 and the illumination unit holding arm 150 are rotated into a position at the table side, for there is a possibility that a device of some kind accidentally collides with the camera head 120. This arrangement allows the camera head 120 that is at once a precision instrument and a heavy load to take a low position, and thereby improves stability of the device as well as reduces possibility of accidents such as the collision of devices.

In order to use the imaging device 100 that is in the mode of storage, a user of the device puts his (her) hand on the camera holding arm 140 or specifically the table side arm 142 and rotates the arm in a manner that pulls it up from the table side. At this time, the imaging device 100 not only rotates the camera holding arm 140 that is subjected to the rotating operation but also uses the arm support mechanism 200 described above to rotate the illumination unit holding arm 150 along with the camera holding arm 140, as shown in FIG. 11. That is, the illumination unit holding arm 150 rotates and leaves the attitude shown in FIG. 5 and inclines with respect to the table 110 as shown in FIG. 11, even if it is not subjected to any rotating operation. Since the stop position of the camera holding arm 140 and thus of the illumination unit holding arm 150 is defined by the contact of the projection 143h of the camera holding arm 140 and the shaft 248, as described previously (see FIG. 8 and FIG. 10.), the arms can be rotated all the way up to the stop position with good reproducibility.

In order to shift the device from the mode shown in FIG. 11 to the attitude prepared for imaging shown in FIG. 1, a user of the device puts his (her) hand on the camera side arm 144 of the camera holding arm 140 and rotates the arm approximately an angle of 180 degrees to make the arm continuous with the table side arm 142. After this operation, the imaging device 100 has the camera head 120 in the attitude for imaging the target object on the table 110. On the other hand, in order to shift the illumination unit 130 into the illuminating attitude suitable for illuminating the target object, a user of the device puts his (her) hand on the illumination unit holding arm 150 and rotates the arm until it reaches a desirable position (for example, a position where the illumination unit 130 takes the illuminating attitude shown in FIG. 1.) At this time, the illumination unit holding arm 150 rotates independently and varies the degree of inclination with respect to the table 110 by means of the above-described axial support by the arm support mechanism 200. That is, the illumination unit holding arm 150 can rotate independently and form any angle with respect to the table 110 while the camera holding arm 140 is kept stopped and holds the camera head 120 in the imaging attitude. This arrangement enables the illumination unit holding arm 150 to rotate independently and thereby adjust the illumination unit 130 into various positions, in conformity with formation (three-dimensional, sheet-like, and the like) or property (whether the surface is glossy or not) of the target object or in the aim of avoiding glare of illumination in the camera head.

In order to shift the device from the mode of imaging shown in FIG. 1 to the mode of e.g. storage shown in FIG. 5, the arms can be rotated reversely. That is, a user of the device puts his (her) arm on the camera holding arm 140 or specifically the table side arm 142 and rotates the arm to bring the arm close to the table side (to minimize the degree of inclination). At this time, the imaging device 100 not only rotates the camera holding arm 140 that is subjected to the rotating operation but also uses the arm support mechanism 200 described above to rotate the illumination unit holding arm 150 along with the camera holding arm 150 and thereby brings the arm close to the table side. That is, the illumination unit holding arm 150 rotates and leaves the attitude shown in FIG. 1 and reduces the angle of inclination with respect to the table 110 as shown in FIG. 5, even if it is not subjected to any rotating operation. If the illumination unit holding arm 150 is inclined posterior to the position shown in FIG. 1, then the illumination unit holding arm 150 after the rotation along with the camera holding arm 140 still remains slightly inclined with respect to the table 110 even though the camera holding arm 140 is rotated until it forms the minimum angle of inclination. In this case, the illumination unit holding arm 150 may further be rotated independently until it forms the minimum angle of inclination with respect to the table.

After the camera holding arm 140 is rotated until it forms the minimum angle of inclination, the camera side arm 144 can be rotated approximately an angle of 180 degrees toward the table side arm 142, so that the imaging device 100 can take the attitude prepared for e.g. storage shown in FIG. 5. It should be noted herein that, in the rotations purposed for e.g. storage of the arms, the stop position of the camera holding arm 140 is also reproducible by the contact of the projection 143h and the shaft 246 (see FIG. 8 and FIG. 10) described previously.

According to the imaging device 100 of the present embodiment, the illumination unit holding arm 150 is always caused to produce the previously described movement in response to the rotation of the camera holding arm 140, as described above. This simplifies rotations of the arms that are required to shift the imaging device 100 from the mode of use to the mode of e.g. storage or reversely from the mode of e.g. storage to the mode of use. Furthermore, the arm angle (degree of inclination with respect to the table 110) of the illumination unit holding arm 150 can be adjusted independently and arbitrarily to bring the illumination unit 130 into a position suitable for illuminating the target object. The usability of the device thus can be improved.

Additionally, in the present embodiment, the angle of the camera head arm 140 at the time the camera head 120 takes the imaging attitude (see FIG. 1) and the angle of the camera head arm 140 at the time the camera head 120 takes the table side camera unit attitude (see FIG. 5) are respectively defined by the contacts of the projection 143h of the camera holding arm 140 with the shaft 246 and the shaft 248 that are interposed between the right and left plates. This also improves operability of the camera holding arm 140 when subjected to the rotating operations.

Additionally, the camera holding arm 140 and the illumination unit holding arm 150 are coaxially and rotatably held by the arm support mechanism 200 in the present embodiment, which is preferable from the viewpoint of both reduction of the space and downsizing of the device. Additionally, the arm support mechanism 200 holds the arms based on the relationship between the holes and the shafts fitted therein, which is helpful in simplifying the device configuration.

In the present embodiment, the arm support mechanism 200 and the camera holding arms 140 and illumination unit holding arm 150 held by the arm support mechanism 200 are formed by using aluminum die-casts and pressed steel plates, and all of the constituent members of the arm support mechanism 200 are also made of metals except for the spacer 234. The constituent members of the arms and the arm support mechanism thus formed are then jointed together in an electrically conducting manner. Therefore, in the camera head 120 held by the camera support arm 140 and in the illumination unit 130 held by the illumination unit holding arm 150, the constituent members of the respective arms and the constituent members of the support mechanism can be used as respective earth ground paths. This arrangement simplifies wire interconnections and makes wiring operations convenient.

Furthermore, in the present embodiment, the camera holding arm 140 and the illumination unit holding arm 150 are axially supported by the elevated portion 118 that is located at the inner-left corner on the top surface of the table 110; whereas no elevation for arm support is provided at a corner that is opposed to the support corner across the cover 117, i.e. at an inner-right corner of the table top surface. Also taking into consideration that the cover 117 becomes coplanar with the top surface of the table 110, it turns out that the inner-right corner of the table top surface can be used as a location for setting a target object, or also as a space for resetting the target object for purpose of changing which portion of the target object is to be imaged. This is also useful in downsizing the table.

Figure 13:
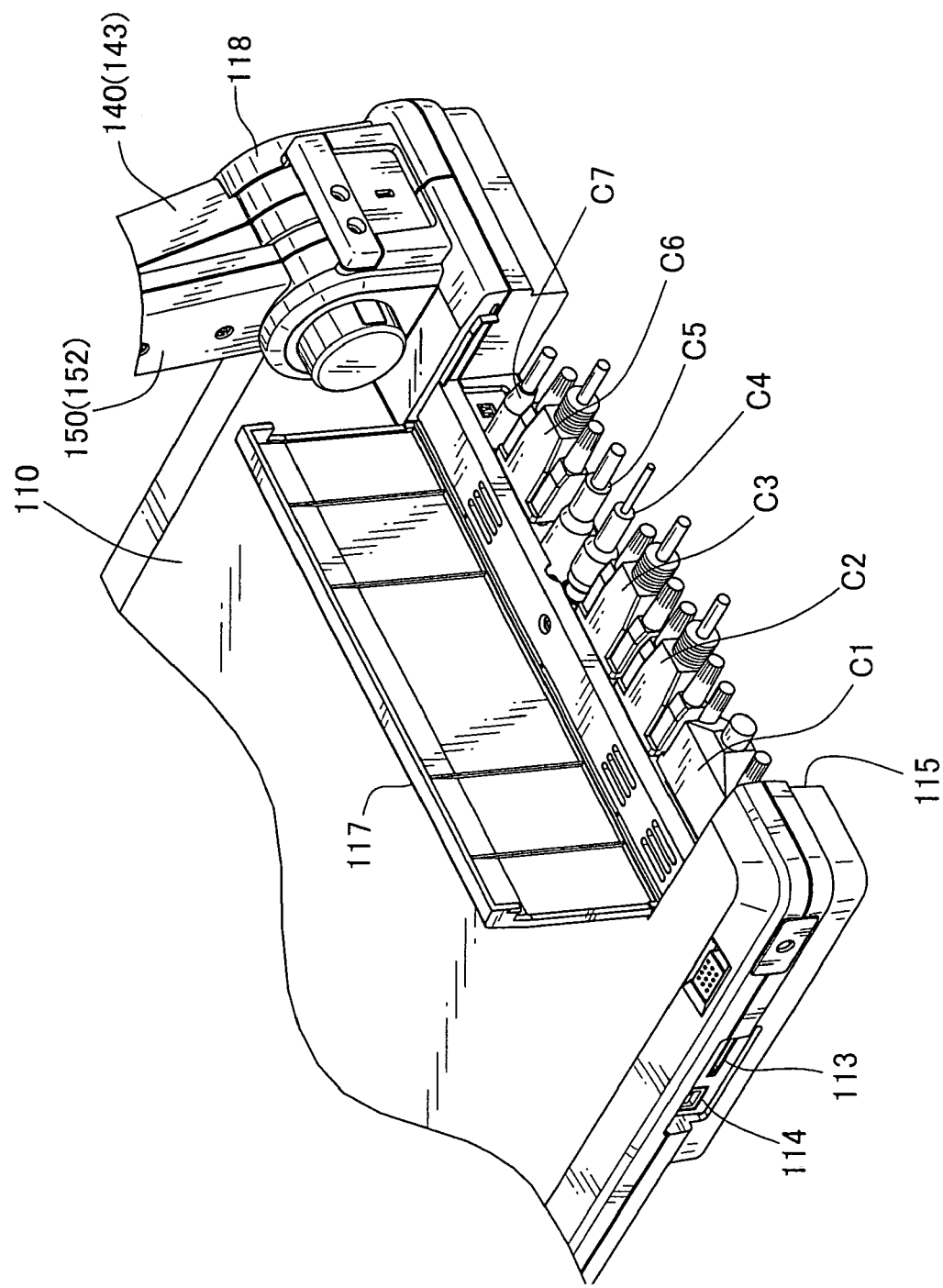
FIG. 13 is a schematic view where a cover 117 is opened to show how connectors are connected to a group of connector terminals 116.

Additionally, since the cover 117 is provided at the rear end of the table 110, the imaging device 100 of the present embodiment can provide the following advantages. FIG. 13 is a schematic view where the cover 117 is opened to shown how connectors are connected to the group of connector terminals 116.

On an inner side wall of the table within the recess 115, which is U-shaped with squared corners and is located at the rear end side of the table, the imaging device has the group of connector terminals 116 that comprise various connector terminals lined up as shown in FIG. 4. Connected to the respective terminals of the group of connector terminals 116 are: DVI connector C1 that supports DVI (Digital Visual Interface) standard and is connected to a high-definition type display (not shown); a connector C2 for outputting RGB signals; a connector C3 for inputting RGB signals; a C terminal connector C4 for outputting composite video signals; a S terminal connector C5 for outputting separate video signals; a RS-232C connector C6 for transmitting and receiving signals to and from an external device i.e. a serial communication device such as a personal computer; and a power connector C7.

Since a user of the device can connect these connectors to their corresponding connector terminals (see FIG. 4) while the cover 117 is kept opened, as shown in FIG. 13, workability of the connecting operations can be improved. Each of the connectors protrudes from the inner side wall of the table within the recess 115 and sometimes further protrudes outside of the table. However, since the cover 117 can be closed to shut these connectors out of view from above the table top surface, appearance of the device can be improved. When the cover 117 is closed, the top surface of the cover 117 becomes substantially coplanar with the top surface of the table 110 and keeps the table top surface continuous. It is thus only under the cover 117 that each of the terminals 116 protrudes outward. This arrangement assures compatibility between the reduction of the space for installing the device and the attachment of the connector terminals in the device.

The attachment of such cover 117 is preferable from the aspect of the previously described effective use of the right corner of the table top surface, when applied to the imaging device of the present embodiment where the camera holding arm 140 and the illumination unit holding arm 150 are rotatably and axially supported by the elevated portion 118 located at the left corner of the table top surface. The cover 117, however, is also applicable to an imaging device where a sufficient space of table top surface is assured and a camera holding arm and an illumination unit holding arm are axially supported at respective corners of the table top surface. Such device also has the benefit of improved appearance.

Figure 14:
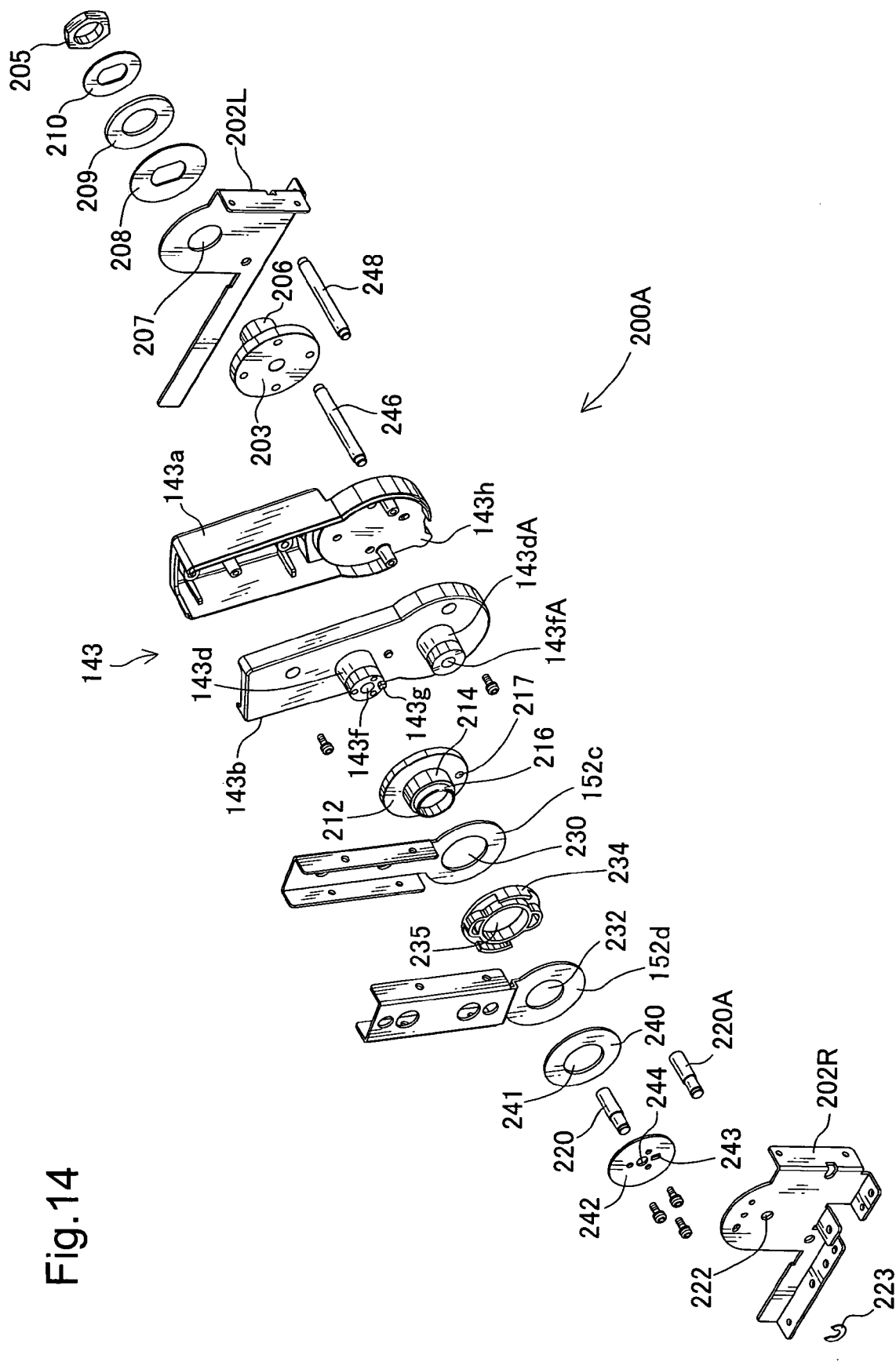
FIG. 14 is an exploded perspective view where parts of an arm support mechanism 200A, which axially supports the camera holding arm 140 and the illumination unit holding arm 150 in an imaging device of a modified example, are dismounted and depicted from the back side of the device.

The following describes a modified example of the above embodiment. The imaging device 100 supports the camera holding arm 140 and the illumination unit holding arm 150 coaxially and also in a manner that causes the previously described arm rotations. An imaging device of the following modification, however, is characterized in axially supporting the arms by using a non-coaxial mechanism. FIG. 14 is an exploded perspective view where parts of an arm support mechanism 200A, which axially supports the camera holding arm 140 and the illumination unit holding arm 150 in the imaging device of the modification, are dismounted and depicted from the back side of the device.

As shown in FIG. 14, the arm support mechanism 200A of the modification has a shaft for axially supporting the camera holding arm 140 and a shaft for axially supporting the illumination unit holding arm 150 in side by side positions on the second part 143b. That is, the second part 143b, which is positioned and attached to the first part 143a, has the previously described columnar projection 143d and an analogous columnar projection 143dA in side by side positions, and at a pin-fitting opening 143fA of the columnar projection 143dA, axially supports the first sub-shaft pin 220A such that the pin becomes coaxial with the previously described first main shaft 204 of the first support shaft main member 203. The camera holding arm 140, therefore, is rotatably and axially supported by the first main shaft 204 and the first sub-shaft pin 220A from both sides in a space between the left plate 202L and the right plate 202R. It should be noted herein that the columnar projection 143dA is not used to fasten the coned disc spring 240 in conjunction with the plain washer 242 and thus does not require any threaded screw hole or projection 143g therein.

At the columnar projection 143d that protrudes above the columnar projection 143dA, the camera holding arm 140 is rotatably and axially supported around the second support shaft 214 and the shaft portion 216 of the second support shaft member 212 by means of members and configurations similar to those described previously. In this case, the first sub-shaft pin 220 is inserted into the opening 243 of the plain washer 242 and functions as a guide to attach the plain washer 242.

Even in such arm support mechanism 220A of the above modification, frictional force during rotation of the camera holding arm 140 after the adjustment of the deflection level of the coned disc spring 209 and frictional force during rotation of the illumination unit holding arm 150 after the adjustment of the deflection level of the coned disc spring 240 are controlled in the similar manner as in the above embodiment, that is, the former is controlled to a level that overcomes the latter.

Even in such modification, when the camera holding arm 140 is rotated about the first main shaft 204 and the first sub-shaft pin 220 on both sides, the illumination unit holding arm 150 can be rotated along with the camera holding arm 140 while being axially supported by the second support shaft 214 of the second support shaft member 212. And when the illumination unit holding arm 150 is rotated, the illumination unit holding arm 150 can be rotated independently about the second support shaft 214 and the shaft portion 216 of the second support shaft member 212. This arrangement thus exerts the same effects as those of the above embodiment.

Figure 15:
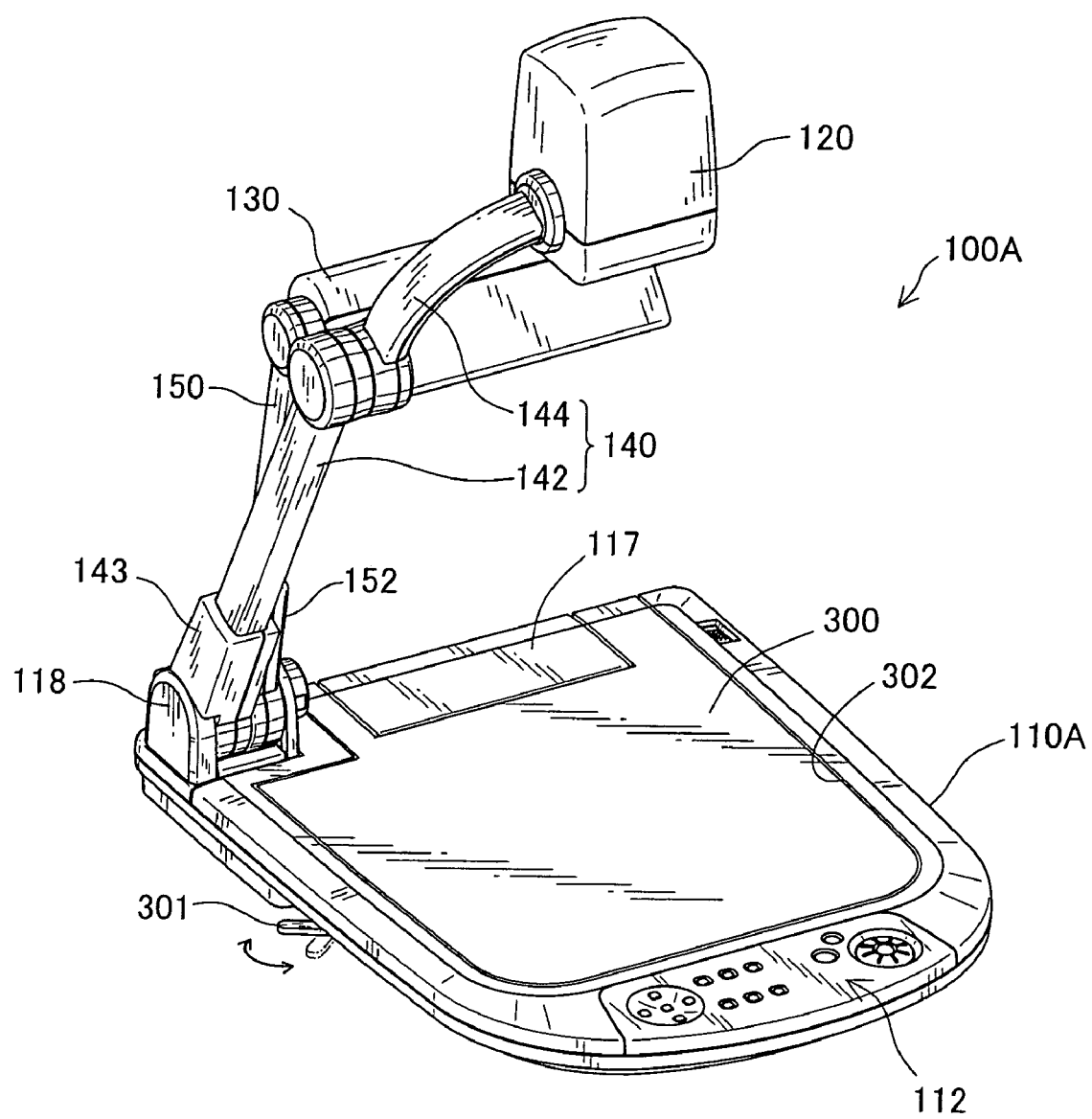
FIG. 15 is a perspective view of an imaging device 100A of another embodiment.
Figure 16:
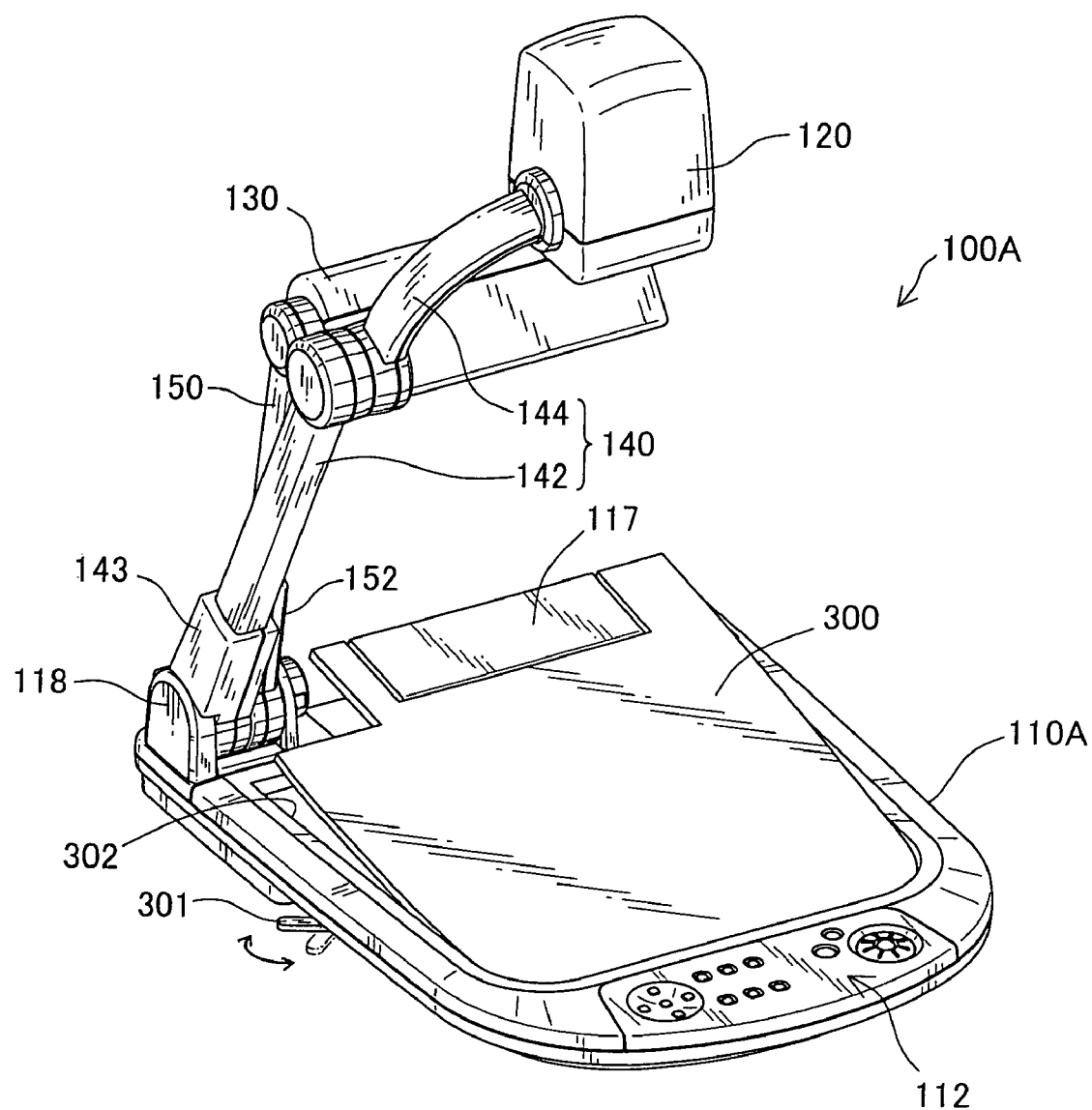
FIG. 16 is a perspective view of the imaging device 100A, where a stage that is incorporated in a table is in an inclined mode.
Figure 17:
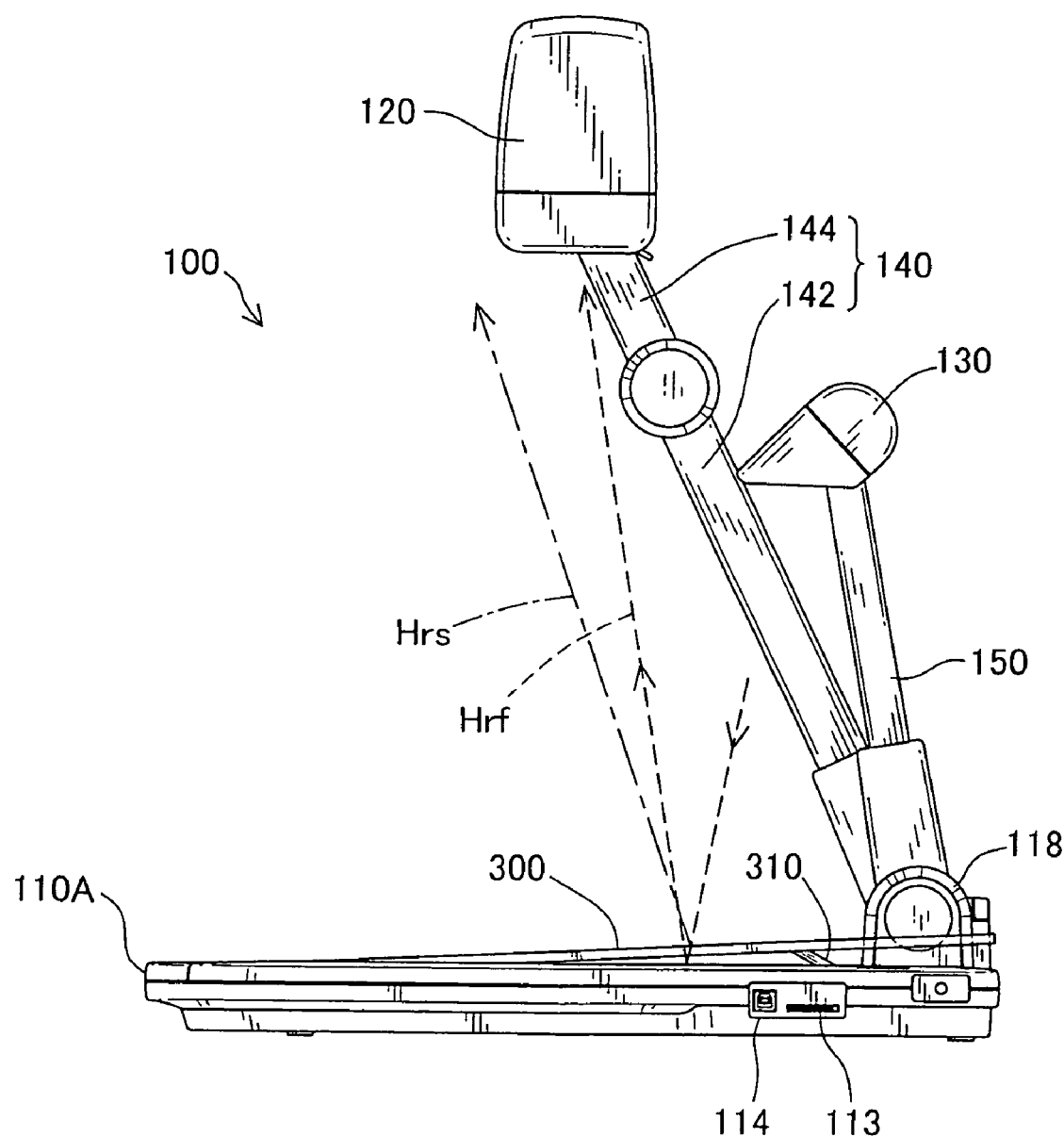
FIG. 17 is a right side view of the imaging device 100A, where the stage is in the inclined mode.
Figure 18:
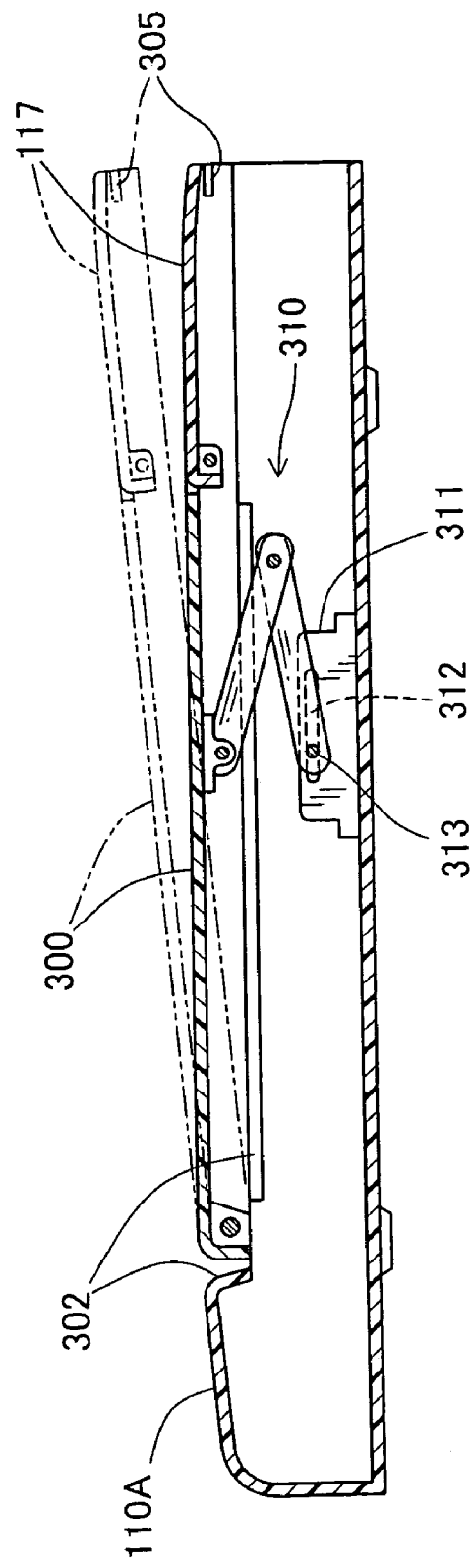
FIG. 18 is a schematic view that schematically describes how a stage inclining mechanism 310 and a stage plate 300 are inclined.

The following describes another embodiment of the present invention. The above embodiment aimed to improve the usability of the device from the aspect of rotating the arms for holding the camera head and the illumination unit. The following embodiment, however, aims to improve the usability of the device by reducing or correcting glare of illumination in the camera head. For example, in the imaging device proposed by the above-mentioned Patent Document, downsizing of the device introduces some restrictions such as on location for installing the light (illumination unit) or on length of the arm for holding the light, and thus limits the range of the repositioning of light (illumination unit). Therefore, the repositioning of light may possibly be insufficient to reduce or correct the glare of illumination in the camera head. In the light of this problem, the present embodiment adopts the following configuration. FIG. 15 is a perspective view of an imaging device 100A of another embodiment; FIG. 16 is a perspective view of the imaging device 100A where a stage that is incorporated in a table is in an inclined mode; FIG. 17 is a right side view of the imaging device 100A where the stage is in the inclined mode; and FIG. 18 is a schematic view that schematically describes how a stage inclining mechanism 310 and a stage plate 300 are inclined.

Similarly to the previously described embodiment, an imaging device 100A of the present embodiment uses a camera holding arm 140 and an illumination unit holding arm 150 to hold a camera head 120 and an illumination unit 130 respectively, and also uses an arm support mechanism 200 of an elevated portion 118 to rotatably hold these arms. The imaging device 100A includes a stage plate 300 on a top surface side of a table 110A and has a slide bar 301 for inclining the plate on a left side surface of the table.

A recess 302 that follows the shape of the stage plate 300 is provided on the top surface of the table 110A, and the stage plate 300 is placed therein. The stage plate 300 occupies substantially a whole area of the top surface of the table 110A except for periphery of the elevated portion 118, and is located in the recess 302 in a manner substantially coplanar with the remaining table top surface. In the imaging device 100A, therefore, it is the stage plate 300 that functions as the table top surface on which a target object is mounted.

The stage plate 300 has a cover 117, which is same as the one that is attached to the table 110 in the previously described imaging device 100, in an openable and closable manner, and also has a cover stopper 305 on rear end. Therefore, as the stage plate 300 is inclined in a manner that will be described later, the cover 117 is also inclined in integration with the stage plate 300. On the other hand, since the cover 117 can be opened and closed independently with respect to the stage plate 300, the cover 117 can function as a covering of the previously described group of connector terminals 116 and connectors connected thereto or as a part of the table top surface (i.e. a top surface of the stage plate 300).

As shown in FIG. 16 and FIG. 17, the stage plate 300 is inclined with respect to the table 110A in a manner that elevates the rear end of the table. In order to attain such inclination of the plate, the present embodiment provides a stage inclining mechanism 310 in the table 110A. The stage inclining mechanism 310 is configured by a link mechanism i.e. a combination of flat plates and pins that are engaged to the plates, and is interposed between the stage plate 300 and a bottom plate of the table 110A. When rotated, the slide bar 301 shown in FIG. 15 slides a pin 313 that is inserted in an elongated hole 312 of a table side hardware 311. The stage inclining mechanism 310 thus inclines the stage plate 300 with respect to the table 110A in a manner that elevates the rear end of the table.

Although the stage inclining mechanism 310 that comprises the link mechanism is employed to cause inclination of the stage in the present embodiment, it goes without saying that any other mechanism may alternatively be employed in the stage inclining mechanism 310, such as a cam mechanism, a crank mechanism, a toggle mechanism, and the like.

As can be seen from the above descriptions, the imaging device 100A that causes inclination of the stage by means of the stage inclining mechanism 310 has the following advantages.

For example, in case where the illumination unit 130 is located posterior to the camera head 120 for the purpose of illumination as shown in FIG. 17, the illumination unit 130 is allowed to take any position as the result of rotation of the illumination unit holding arm 150. Therefore, under a circumstance where the stage plate 300 is set within the recess 302 of the table 110A, the light that is irradiated by the illumination unit 130 and then reflected off the table top surface (i.e. the top surface of the stage plate 300) may possibly follow a reflex path Hrf shown in the FIG. 17 and glare into the camera head 120 depending on the position of the illumination unit 130. Such a situation gives rise to the glare of illumination in the camera head 120 and thereby introduces disturbances in taken images. Even in case where no glare of illumination is produced so far, transfer or replacement of the target object may introduce the glare of illumination due to differences in shape and property of the target object(s).

Under such situation, the imaging device 100A of the present embodiment can use the stage inclining mechanism 310, which has undergone the rotation of the slide bar 301, to incline the stage plate 300. Since the top surface of the stage plate 300 is also inclined as the stage plate 300 is inclined, the inclination of the stage plate 300 results in simultaneous variations of an illuminating angle of the illumination light from the illumination unit 130 toward the plate top surface and an angle of optical axis of the camera head 120. Therefore, the reflected light that used to follow e.g. the reflex path Hrf into the camera head 120 before the inclination of the camera head 300 alternately follows a reflex path Hrs and deviates from the camera head 120. The glare of illumination in the camera head 120 is thus reduced or corrected.

That is, according to the imaging device 100A of the present embodiment, the glare of illumination in the camera head 120 can be reduced or corrected by the following two different methods: repositioning the illumination unit 130 by rotating the illumination unit holding arm 150; and inclining the stage plate 300 by using the stage inclining mechanism 310. In addition, even in case where e.g. downsizing of the device introduced some restrictions on such as location for installing the illumination unit 130 and length of the holding arm of the illumination unit and made the illumination unit 130 difficult to be repositioned, the glare of illumination in the camera head 120 can still be reduced or corrected by the inclination of the stage plate 300 with ease. Consequently, according to the imaging device 100A of the present embodiment, the usability of the device can be improved in terms of reducing or correcting the glare of illumination in the camera head 120 as well as in terms of responding to the downsizing of the device.

In the imaging device 100A of the present embodiment, the stage plate 300 was inclined in a manner that elevates the rear end of the table i.e. the table side on which the illumination unit 130 is located for purpose of illumination. The inclination of the stage diverts the reflex path Hrs of the reflected light away from the camera head in a direction receding from the illumination unit 130. The glare of illumination in the camera head 120 thus can be reduced or corrected with more reliability.

The present invention is not restricted to the above embodiments or their modified examples, but there may be a variety of other modifications, changes, and alterations without departing from the scope or spirit of the main characteristics of the present invention. For example, the inclinable stage plate 300 is also applicable to such an imaging device that axially supports the camera holding arm 140 for the camera head 120 and the illumination unit holding arm 150 for the illumination unit 130 in a separate way.

Alternatively, the amount of slide of the slide bar 301 of the imaging device 100A may be adjustable to achieve variable setting of the degree of inclination of the stage plate 300. This preferably scales up the ability of the device in terms of reducing or correcting the glare of illumination. Furthermore, the surface of the stage plate 300 may be provided with irregularities or may have a sheet made of a material with large frictional property bonded on the stage surface. This arrangement reduces slipperiness of the target object at the time the stage plate 300 is inclined.

What is claimed is:

1. An imaging device comprising:
a camera head that images an imaging-area of a table on which an imaging-object is laid;
an illumination unit that illuminates the imaging-area;
a camera holding arm that holds the camera head such that the camera head images the imaging-area from above the table;
an illumination unit holding arm that holds the illumination unit such that the illumination unit illuminates a top face area of the table form above the table;
an arm support module that rotatably supports the camera holding arm and the illumination unit holding arm on the table such that their degrees of inclinations are variable with respect to the table, and holds the rotated camera holding arm and the rotated illumination unit holding arm at their respective inclined positions after rotations; and
a rotating mechanism that, in the case where the camera holding arm is rotated, generates a movement of the illumination unit holding arm that causes the illumination unit holding arm to rotate along with the camera holding arm, and in the case where the illumination unit holding arm is rotated, causes the illumination unit holding arm to rotate independently with no accompanying change in the inclined position of the camera holding arm;
wherein the arm support module coaxially and rotatably supports the camera holding arm and the illumination unit holding arm with respect to the table.

2. The imaging device according to claim 1, wherein the arm support module axially supports the illumination unit holding arm such that the illumination unit can take an illuminating attitude where the illumination unit illuminates the top face area from above the table and a table side illumination attitude where the illumination unit gets close to a top surface of the table, and axially supports the camera head holding arm such that the camera head can take an imaging attitude where the camera head images the imaging-area from above the table and a table side camera attitude where the camera head gets close to the top surface of the table.

3. The imaging device according to claim 1, wherein the rotating mechanism includes:
a first shaft that rotatably and axially supports the camera holding arm with respect to the table;
a first adjustment module that adjusts frictional force that is generated when the camera holding arm rotates about the first shaft;
a second shaft that is concentric with the first shaft and rotates along with the camera holding arm, the second shaft rotatably and axially supporting the illumination unit holding arm; and
a second adjustment module that adjusts frictional force that is generated when the illumination unit holding arm rotates about the second shaft,
wherein the first adjustment module adjusts the frictional force to a level that overcomes the frictional force adjusted by the second adjustment module.

4. The imaging device according to claims 1, further comprising:
a side wall that surrounds the table and a recess that notches the table top surface;
connector terminals that are provided within the recess and are used for connections with external devices, and
a cover that is provided to the table and covers the recess of the table top surface,
wherein the cover and the table are substantially coplanar.

5. The imaging device according to claim 4, wherein the cover is attached to the table such that the cover opens and closes the recess of the table top surface.

6. The imaging device according to claim 5, wherein the table is rectangular, and
the arm support module axially supports the camera holding arm and the illumination unit holding arm at a corner of the table that is located lateral to the recess of the table top surface.

7. An imaging device comprising:
a camera head that images an imaging-area of a table which an imaging-object is laid on; and
an illumination unit that illuminates on the table,
wherein the table includes:
a table body;
a stage member that is incorporated in the table body and forms a top surface of the table; and
an inclining mechanism that inclines the stage member with respect to the table body.

8. The imaging device according to claim 7, wherein the inclining mechanism inclines the stage member in a manner that elevates one side of the stage member on which the illumination unit is located for purpose of illuminating.

9. An imaging device comprising:
a camera head that images an imaging-area of a table on which an imaging-object is laid;
an illumination unit that illuminates the imaging-area;
a camera holding arm that holds the camera head such that the camera head images the imaging-area from above the table;
an illumination unit holding arm that holds the illumination unit such that the illumination unit illuminates a top face area of the table form above the table;
an arm support module that rotatably supports the camera holding arm and the illumination unit holding arm on the table such that their degrees of inclinations are variable with respect to the table, and holds the rotated camera holding arm and the rotated illumination unit holding arm at their respective inclined positions after rotations; and
a rotating mechanism that, in the case where the camera holding arm is rotated, generates a movement of the illumination unit holding arm that causes the illumination unit holding arm to rotate along with the camera holding arm, and in the case where the illumination unit holding arm is rotated, causes the illumination unit holding arm to rotate independently with no accompanying change in the inclined position of the camera holding arm;
wherein the arm support module axially supports the illumination unit holding arm such that the illumination unit can take an illuminating attitude where the illumination unit illuminates the top face area from above the table and a table side illumination attitude where the illumination unit gets close to a top surface of the table, and axially supports the camera head holding arm such that the camera head can take an imaging attitude where the camera head images the imaging-area from above the table and a table side camera attitude where the camera head gets close to the top surface of the table;
wherein the arm support module coaxially and rotatably supports the camera holding arm and the illumination unit holding arm with respect to the table.

10. The imaging device according to claim 9, wherein the rotating mechanism includes:
a first shaft that rotatably and axially supports the camera holding arm with respect to the table;
a first adjustment module that adjusts frictional force that is generated when the camera holding arm rotates about the first shaft;
a second shaft that is concentric with the first shaft and rotates along with the camera holding arm, the second shaft rotatably and axially supporting the illumination unit holding arm; and
a second adjustment module that adjusts frictional force that is generated when the illumination unit holding arm rotates about the second shaft,
wherein the first adjustment module adjusts the frictional force to a level that overcomes the frictional force adjusted by the second adjustment module.

* * * * *